United States Patent [19]

Kimura et al.

[11] Patent Number: 5,618,930
[45] Date of Patent: Apr. 8, 1997

[54] PHTHALOCYANINE COMPOUND AND METHOD FOR MAKING, NITRO-SUBSTITUTED PHTHALOCYANINE COMPOUND, AMINO-SUBSTITUTED PHTHALOCYANINE COMPOUND, PHTHALOCYANINE-CONTAINING POLYMER AND METHOD FOR MAKING, CATALYST, AND OPTICAL RECORDING MEDIUM

[75] Inventors: Mutsumi Kimura, Ueda; Hirofusa Shirai, 2496, Nagase, Maruko-cho, Chiisagata-gun, Nagano; Toshiki Koyama; Kenji Hanabusa, both of Ueda; Yuichi Kubota, Chiba, all of Japan

[73] Assignees: Hirofusa Shirai, Nagano; TDK Corporation, Tokyo, both of Japan

[21] Appl. No.: 609,548

[22] Filed: Mar. 1, 1996

Related U.S. Application Data

[62] Division of Ser. No. 305,881, Sep. 14, 1994, Pat. No. 5,516,900.

[30] Foreign Application Priority Data

Sep. 14, 1993 [JP] Japan ................................... 5-252493

[51] Int. Cl.$^6$ .................................................. C09B 47/04
[52] U.S. Cl. ........................... 540/143; 540/122; 540/130; 540/139; 540/142
[58] Field of Search ..................... 540/122, 139, 540/130, 135, 143

[56] References Cited

U.S. PATENT DOCUMENTS

| 4,132,841 | 1/1979 | Champenois | 526/221 |
| 4,372,893 | 2/1983 | Eckert | 260/465 E |
| 4,783,386 | 11/1988 | Nikles et al. | 430/19 |
| 5,354,858 | 10/1994 | Morgan et al. | 540/145 |
| 5,484,915 | 1/1996 | Gregory et al. | 540/136 |

Primary Examiner—Mukund J. Shah
Assistant Examiner—Pavanaram K. Sripada
Attorney, Agent, or Firm—Oblon, Spivak, McClelland, Maier & Neustadt, P.C.

[57] ABSTRACT

A novel phthalocyanine compound having improved solubility and high purity and containing a polymerizable vinyl group within its molecule is provided. Intermediates to this phthalocyanine compound also have improved solubility and high purity. Further, with the novel phthalocyanine compound used as a starting monomer, a novel polymer is obtained which has a high content of (metal) phthalocyanine and is easy to control the orientation of phthalocyanine rings. The polymer having improved solubility and high purity is expected of use as functional material such as catalysts and recording material.

7 Claims, 2 Drawing Sheets 5,618,930

PHTHALOCYANINE COMPOUND AND METHOD FOR MAKING, NITRO-SUBSTITUTED PHTHALOCYANINE COMPOUND, AMINO-SUBSTITUTED PHTHALOCYANINE COMPOUND, PHTHALOCYANINE-CONTAINING POLYMER AND METHOD FOR MAKING, CATALYST, AND OPTICAL RECORDING MEDIUM

This is a division of Ser. No. 305,881, filed Sep. 14, 1994, now U.S. Pat. No. 5,516,900.

BACKGROUND OF THE INVENTION

This invention relates to a novel phthalocyanine compound and a method for preparing the same, intermediates or analogues used in the method, a phthalocyanine-containing polymer obtained by starting with the novel phthalocyanine compound and a method for preparing the same. It also relates to a catalyst and an optical recording medium using such a phthalocyanine compound or polymer.

Phthalocyanines are macrocyclic dyes having a structure similar to porphyrin compounds and they are stable against light, heat and moisture, chemically stable and fast. Especially metal phthalocyanines have been widely used as dyes or pigments because of their high stability and definite color tone. They now draw interest as materials for light absorption, electric conduction, photo-conduction, energy conversion, electrode and catalyst because of the presence of a metal ion in a large π-electron conjugated system. However, they are difficult to dissolve, to work up to high purity, and to handle under ambient conditions. Currently, great attention is paid to the phthalocyanine compounds as recording material for optical recording media such as write-once compact disks (CD-R). For such application purposes, their low solubility in solvents for use in coating of a recording layer is detrimental.

Attempts were made to produce a polymer having carried thereon a phthalocyanine, especially a metal phthalocyanine for facilitating formation of films or similar items capable of exerting a high function. Such a metal phthalocyanine-containing polymer is produced, for example, by synthesizing a metal phthalocyanine derivative having a reactive group and reacting it with a polymer having introduced therein a group reactive with the reactive group (see D. Whrle et al., J. Org. Organomet. Polym., 1, 1,115 (1991)). This type of synthetic method wherein a metal phthalocyanine derivative is reacted with a poller, however, suffers from the problem that the reaction product has an inconsistent content of metal phthalocyanine ring.

Also proposed were metal phthalocyanine derivatives which have a vinyl group and are thus polymerizable by themselves as disclosed in Japanese Patent Application Kokai (JP-A) Nos. 184083/1985 and 53990/1987. It was also attempted to produce polymers by starting with them as disclosed in JP-A 50311/1987. The metal phthalocyanine derivatives are obtained by starting with a metal phthalocyanine tetracarboxylic acid and introducing a vinyl group therein. Synthesis of a metal phthalocyanine tetracarboxylic acid entails formation of much by-products probably because of solid-phase reaction. Also most intermediates to the vinyl group-containing metal phthalocyanine derivatives are sparingly soluble and difficult to purify. Then the final products are low in purity. While vinyl groups are introduced in a number proportional to the number of carboxy groups and thus typically four vinyl groups are introduced, often those products having vinyl groups in a number other than the desired number are concomitantly produced, which are difficult to separate and thus cause a lowering of purity. Moreover, the vinyl group-containing metal phthalocyanine derivatives are less soluble.

The resulting polymer is often a three-dimensional polymer since the metal phthalocyanine derivative has four vinyl groups as a general rule. This complies with the purpose of having a vinyl polymer carry a metal phthalocyanine like a crosslinking agent, but not with the purpose of synthesizing a linear polymer.

Therefore, it is desired to have a phthalocyanine compound having a sufficiently increased solubility to use as a recording material for optical recording media. It is also desired to develop a polymerizable phthalocyanine compound having improved solubility and purity and offering a freedom of choice of a ligand metal to the phthalocyanine. It is further desired to produce a polymer from the phthalocyanine compound as a starting monomer, the polymer having improved solubility, high purity, easy control of orientation, and a high phthalocyanine content.

SUMMARY OF THE INVENTION

A first object of the present invention is to provide a novel phthalocyanine compound having improved solubility and high purity, containing a polymerizable vinyl group within its molecule and expected to find use as a photo-functional material, typically a recording material for write-once compact disks and other optical recording media and a method for preparing the same.

A second object of the present invention is to provide nitro- and amino-substituted phthalocyanine compounds which have improved solubility and high purity, can be used in preparing the first-mentioned novel phthalocyanine compound, and are expected to find use as a photo-functional material.

A third object of the present invention is to provide a novel phthalocyanine-containing polymer having a high phthalocyanine content, easy control of orientation, improved solubility, and high purity, and expected to find use as a photo-functional material and a method for preparing the same using the first-mentioned novel phthalocyanine compound.

A fourth object of the present invention is to provide a catalyst using the phthalocyanine-containing polymer.

According to the present invention, there is provided a phthalocyanine compound of the following formula:

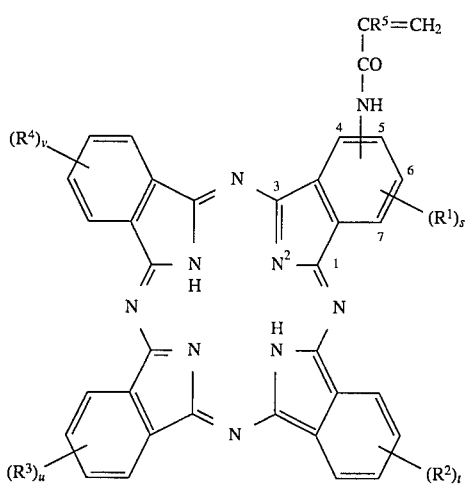

wherein $R^1$, $R^2$, $R^3$, and $R^4$ are independently selected from the group consisting of an alkyl, alkoxy, alkylthio, and arylthio group, letter s is equal to 0 or an integer of 1 to 3, and the $R^1$ groups may be identical or different when s is at least 2, letters t, u and v each are equal to 0 or an integer of 1 to 4, and the $R^2$, $R^3$, and $R^4$ groups may be identical or different when t, u and v are at least 2, respectively, with the proviso that all of s, t, u, and v are not equal to 0 at the same time, the sum of s+t+u+v being an Lnteger of at least 1, and $R^5$ is a hydrogen atom or alkyl group.

The present invention also provides a phthalocyanine compound of the following formula:

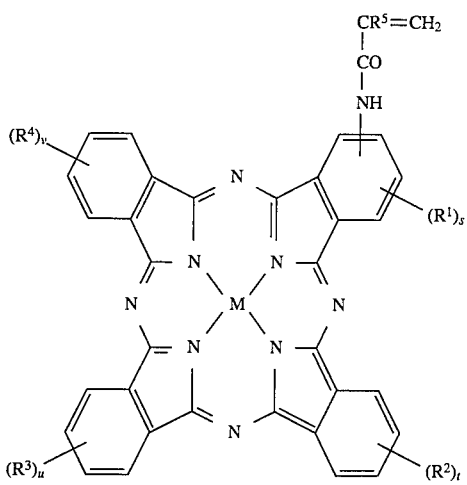

wherein $R^1$ to $R^5$, s, t, u and v are as defined above, and M is a metal atom.

In a second aspect, the invention provides a method for preparing a phthalocyanine compound of formula (1), comprising the steps of:

forming a nitro-substituted phthalocyanine compound of the following formula (3) by reacting phthalonitriles including an alkyl-, alkoxy-, alkylthio- or arylthio-substituted phthalonitrile and a nitrophthalonitrile or by effecting substitution reaction of a halogenated nitro-substituted phthalocyanine compound, reducing the nitro group of said nitro-substituted phthalocyanine compound to form an amino-substituted phthalocyanine compound of the following formula (4), and introducing an acryloyl group into the amino group of said amino-substituted phthalocyanine compound of formula (4) to form the phthalocyanine compound of formula (1).

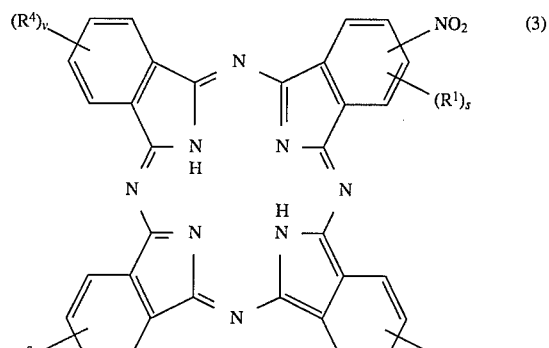

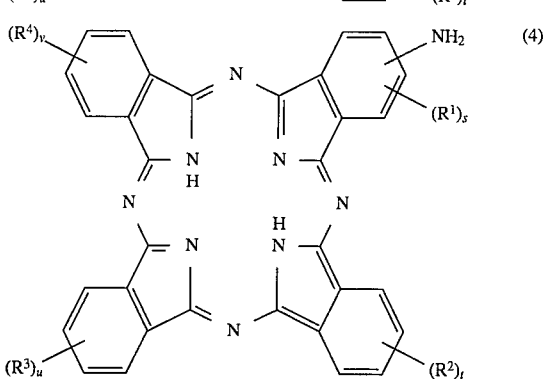

$R^1$ to $R^5$, s, t, u, and v are as defined above

The invention further provides a method for preparing a metal phthalocyanine compound comprising the step of introducing a metal into the above-prepared phthalocyanine compound to form the metal phthalocyanine compound.

Also contemplated are the nitro-substituted phthalocyanine compound of formula (3) and the amino-substituted phthalocyanine compound of formula (4) obtained in intermediate steps of the method as well as a nitro-substituted phthalocyanine compound having a metal introduced into the nitro-substituted phthalocyanine compound and an amino-substituted phthalocyanine compound having a metal introduced into the amino-substituted phthalocyanine compound.

In a third aspect, the present invention provides a phthalocyanine-containing polymer having a structural unit of the following formula (5):

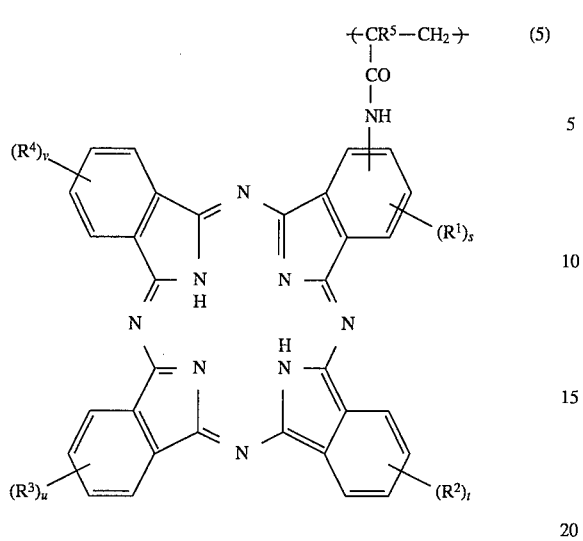
(5)
wherein $R^1$ to $R^5$, s, t, u, and v are as defined above
Also provided is a phthalocyanine-containing polymer having a structural unit of the following formula (6):
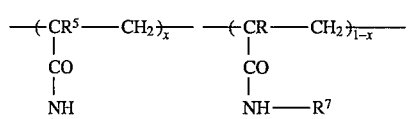
(6)
wherein $R^1$ to $R^5$, s, t, u, v, and M are as defined above
In a fourth aspect, the invention provides a phthalocyanine-containing copolymer having a structural unit of the following formula (7):
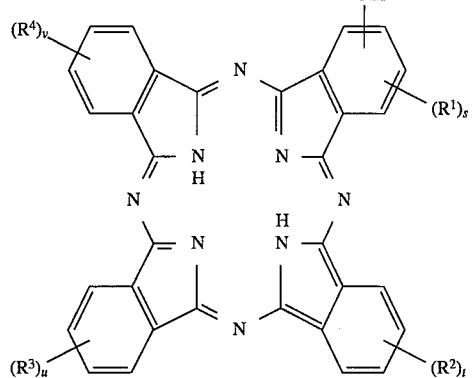
(7)

wherein $R^1$ to $R^5$, s, t, u, and v are as defined above, $R^6$ is a hydrogen atom or alkyl group, $R^7$ is a hydrogen atom or alkyl group, and x is a number meeting $0<x<1$.

In a fifth aspect, the invention provides a phthalocyanine-containing copolymer having a structural unit of the following formula (8):

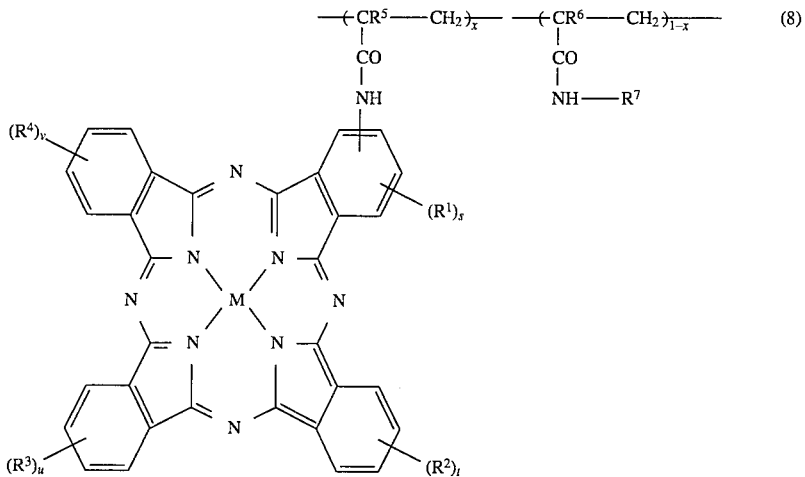

wherein $R^1$ to $R^5$, s, t, u, v, M, $R^6$, $R^7$, and x are as defined above.

In a sixth aspect, the invention provides a method for preparing a phthalocyanine-containing polymer comprising the step of polymerizing the phthalocyanine compound of formula (1) as a starting monomer to form the phthalocyanine-containing polymer of formula (5). The invention further provides a method for preparing a phthalocyanine-containing polymer comprising the step of introducing a metal into the phthalocyanine-containing polymer of formula (5) to produce the phthalocyanine-containing polymer of formula (6).

A catalyst comprising the phthalocyanine-containing copolymer of formula (8) is also contemplated herein.

Also contemplated herein is an optical recording medium having a recording layer containing a phthalocyanine compound or phthalocyanine-containing polymer or copolymer as set forth herein.

DETAILED DESCRIPTION OF THE INVENTION

Figure 1:
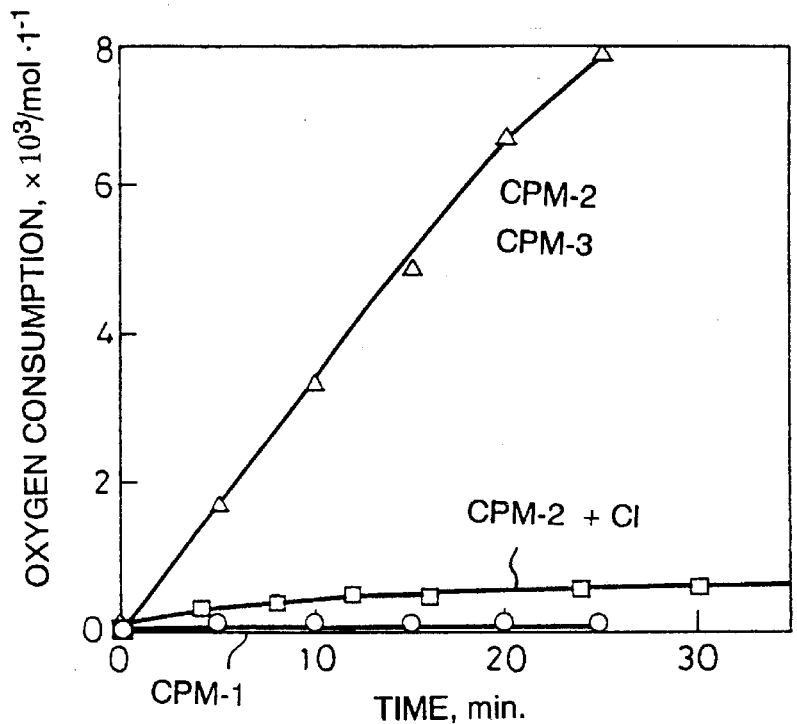
FIG. 1 is a graph showing the catalytic activity of phthalocyanine-containing polymers according to the invention.

In the first aspect, the present invention is directed to phthalocyanine compounds of formulae (1) and (2), precursors thereof represented by formulae (3) and (4), and those precursors having a metal introduced therein.

First, the phthalocyanine compound of formula (1) is described.

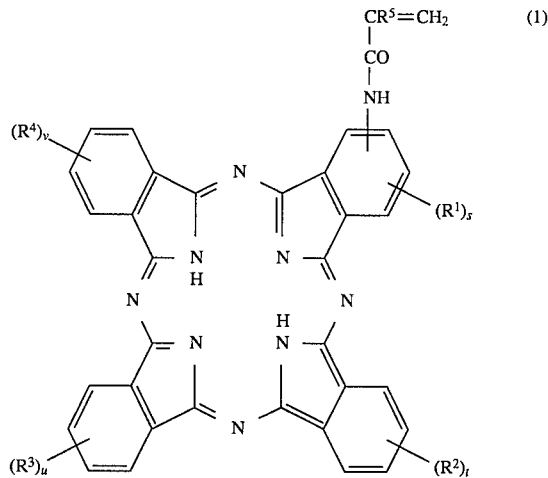

In formula (1), $R^1$, $R^2$, $R^3$, and $R^4$ are independently selected from the group consisting of an alkyl, alkoxy, alkylthio, and arylthio group. They may be identical or different. Letter s is equal to 0 or an integer of 1 to 3, and t, u and v each are equal to 0 or an integer of 1 to 4. The $R^1$ groups may be identical or different when s is 2 or 3. The $R^2$ groups may be identical or different when t is 2, 3 or 4. The $R^3$ groups may be identical or different when u is 2, 3 or 4. The $R^4$ groups may be identical or different when v is 2, 3 or 4.

The alkyl groups represented by $R^1$, $R^2$, $R^3$, and $R^4$ may be either substituted or unsubstituted and either straight or branched. Branched alkyl groups are preferred if they are unsubstituted. Preferred unsubstituted alkyl groups have 1 to 3 secondary, tertiary or quaternary carbon atoms and they contain 3 to 6 carbon atoms. Exemplary are i-propyl, t-butyl, s-butyl, i-butyl, i-pentyl, neo-pentyl, t-pentyl, i-hexyl, neo-hexyl, t-hexyl and 1,4-dimethylbutyl groups. Preferred substituted alkyl groups are free of or have 1 to 3 secondary, tertiary or quaternary carbon atoms and they contain 2 to 6 carbon atoms. The substituents on alkyl groups are preferably halogen atoms, especially fluorine. Fluorine substitution may range from single substitution to entire substitution. Exemplary are $C_2F_5-$, $t-C_4F_9$, and $CH_3-CH(F)-$.

The alkoxy groups represented by $R^1$, $R^2$, $R^3$, and $R^4$ may be either substituted or unsubstituted. The alkyl moiety of the alkoxy group is preferably as mentioned just above. Examples of the alkoxy group include i—$C_3H_7O-$, t—$C_4H_9O-$, s—$C_4H_9O-$, t—$C_5H_{11}O-$, t—$C_6H_{13}O-$, $(CH_3)_2CHCH_2CH(CH_3)O-$, and $CH_3CH(F)O-$.

The alkylthio groups represented by $R^1$, $R^2$, $R^3$, and $R^4$ may be either substituted or unsubstituted, with the unsubstituted ones being preferred. The alkyl moiety of the alkylthio group may be either straight or branched and contain 1 to 6 carbon atoms. Exemplary alkylthio groups include methylthio, ethylthio, n-propylthio, i-propylthio, n-butylthio, s-butylthio, and t-butylthio groups.

The arylthio groups represented by $R^1$, $R^2$, $R^3$, and $R^4$ may be either substituted or unsubstituted. Preferred aryl moieties are unsubstituted aryl and alkaryl having 6 to about 10 carbon atoms. Typical are phenylthio and tolylthio groups. The alkyl, alkoxy, alkylthio and arylthio groups represented by $R^1$, $R^2$, $R^3$, and $R^4$ are sometimes referred to as specific substituents, hereinafter.

All of s, t, u, and v are not equal to 0 at the same time. That is, the sum of s+t+u+v is at least 1. More particularly, the sum is an integer of 1 to 15, preferably an integer of 1 to 6. Preferably s is equal to 0.

Preferably, at least one of $R^1$ to $R^4$ attached to benzene rings of phthalocyanine, especially at least one of $R^2$ to $R^4$ is a preferable alkyl, alkoxy, alkylthio or arylthio group as mentioned above. More preferred are phthalocyanine compounds of formula (1) wherein s=0 and each of t, u and v is equal to 1 and each of $R^2$, $R^3$ and $R^4$ is a preferable alkyl, alkoxy, alkylthio or arylthio group as mentioned above. In such a case, the group other than the specific substituent attached to a benzene ring is a hydrogen atom although a substituent other than the specific substituent, for example, a methyl group may be attached to a benzene ring.

The vinyl-containing amide ($-NHCOCR^5=CH_2$) group is preferably at the 5-position of the isoindole ring. The substitution positions of $R^1$ to $R^4$ are preferably at the 4- or 5-position of the respective isoindole rings. It is understood that the substitutions at 4- and 7-positions are equivalent as well as the substitutions at 5- and 6-positions.

For phthalocyanine compounds of the formula wherein at least one of $R^1$ to $R^4$ is an alkoxy group, also preferred are halogenated phthalocyanine compounds which are obtained by reacting the phthalocyanine compound with a halogenating agent to introduce halogen into its molecule. The halogen used herein is typically bromine and the number of substituting halogen atoms is 1 to 4, especially 2 to 4.

$R^5$ is a hydrogen atom or alkyl group. The alkyl group represented by $R^5$ may be either substituted or unsubstituted. Alkyl groups having 1 to 4 carbon atoms are preferred. Exemplary are methyl, ethyl, propyl, and butyl groups. More preferably, $R^5$ is a hydrogen atom or a methyl group.

Preferred among the phthalocyanine compounds of formula (1) are those of the following formulae (9), (10), and (11).

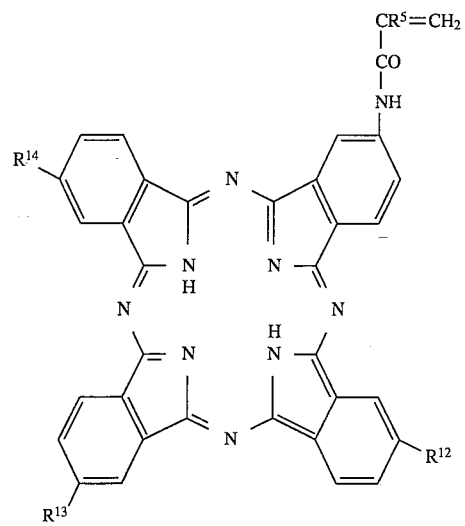

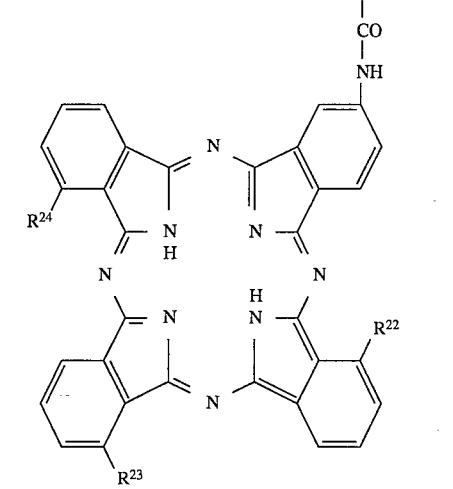

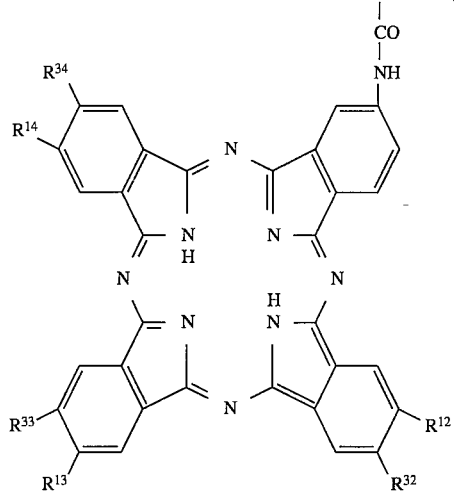

In formulae (9) to (11), $R^5$ is as defined in formula (1). In formula (9), each of $R^{12}$, $R^{13}$, and $R^{14}$ is a hydrogen atom or a substituent as defined for $R^1$ to $R^4$ in formula (1). At least one of $R^{12}$, $R^{13}$, and $R^{14}$ is a specific substituent. In formula (10), $R^{22}$, $R^{23}$, and $R^{24}$ are the same as defined for $R^{12}$, $R^{13}$, and $R^{14}$ in formula (9), respectively. In formula (11), each of $R^{12}$ to $R^{14}$ and $R^{32}$ to $R^{34}$ is a hydrogen atom or a specific substituent as defined for $R^1$ to $R^4$ in formula (1). It is to be noted that at least one of the combinations of $R^{12}$ and $R^{32}$, $R^{13}$ and $R^{33}$, and $R^{14}$ and $R^{34}$ is a combination of specific substituents.

Preferred illustrative examples of the phthalocyanine compound of formula (1) are shown below as M-1 through M-37. Table 1 represents combinations of $R^5$, $R^{12}$, $R^{13}$, and $R^{14}$ in formula (9). Table 2 represents combinations of $R^5$, $R^{22}$, $R^{23}$, and $R^{24}$ in formula (10). M-35 and M-36 show that two to four bromine atoms are present as substituents. Note that Ph is phenyl.

TABLE 1

Formula (9)

| Compound | $R^5$ | $R^{12}$ | $R^{13}$ | $R^{14}$ |
|---|---|---|---|---|
| M-1 | H | t-$C_4H_9$ | t-$C_4H_9$ | t-$C_4H_9$ |
| M-2 | $CH_3$ | t-$C_4H_9$ | t-$C_4H_9$ | t-$C_4H_9$ |
| M-3 | H | s-$C_4H_9$ | s-$C_4H_9$ | s-$C_4H_9$ |
| M-4 | H | t-$C_5H_{11}$ | t-$C_5H_{11}$ | t-$C_5H_{11}$ |
| M-5 | H | t-$C_6H_{13}$ | t-$C_6H_{13}$ | t-$C_6H_{13}$ |
| M-6 | H | i-$C_3H_7$ | i-$C_3H_7$ | i-$C_3H_7$ |
| M-7 | H | t-$C_4H_9O$ | t-$C_4H_9O$ | t-$C_4H_9O$ |
| M-8 | H | s-$C_4H_9O$ | s-$C_4H_9O$ | s-$C_4H_9O$ |
| M-9 | H | t-$C_5H_{11}O$ | t-$C_5H_{11}O$ | t-$C_5H_{11}O$ |
| M-10 | H | t-$C_6H_{13}O$ | t-$C_6H_{13}O$ | t-$C_6H_{13}O$ |
| M-11 | H | i-$C_3H_7O$ | i-$C_3H_7O$ | i-$C_3H_7O$ |
| M-12 | H | $C_2F_5$ | $C_2F_5$ | $C_2F_5$ |
| M-13 | H | t-$C_4H_9$ | t-$C_4H_9$ | t-$C_4H_9$ |
| M-14 | H | $CH_3$\\CHO/F | $CH_3$\\CHO/F | $CH_3$\\CHO/F |
| M-15 | H | $(CH_3)_2CHCH_2CHO$ \| $CH_3$ | $(CH_3)_2CHCH_2CHO$ \| $CH_3$ | $(CH_3)_2CHCH_2CHO$ \| $CH_3$ |
| M-16 | H | $CH_3$—Ph—S | $CH_3$—Ph—S | $CH_3$—Ph—S |
| M-17 | H | t-$C_4H_9S$ | t-$C_4H_9S$ | t-$C_4H_9S$ |

TABLE 2

Formula (10)

| Compound | $R^5$ | $R^{22}$ | $R^{23}$ | $R^{24}$ |
|---|---|---|---|---|
| M-18 | H | t-$C_4H_9$ | t-$C_4H_9$ | t-$C_4H_9$ |
| M-19 | $CH_3$ | t-$C_4H_9$ | t-$C_4H_9$ | t-$C_4H_9$ |
| M-20 | H | s-$C_4H_9$ | s-$C_4H_9$ | s-$C_4H_9$ |
| M-21 | H | t-$C_5H_{11}$ | t-$C_5H_{11}$ | t-$C_5H_{11}$ |
| M-22 | H | t-$C_6H_{13}$ | t-$C_6H_{13}$ | t-$C_6H_{13}$ |
| M-23 | H | i-$C_3H_7$ | i-$C_3H_7$ | i-$C_3H_7$ |
| M-24 | H | t-$C_4H_9O$ | t-$C_4H_9O$ | t-$C_4H_9O$ |
| M-25 | H | s-$C_4H_9O$ | s-$C_4H_9O$ | s-$C_4H_9O$ |
| M-26 | H | t-$C_5H_{11}O$ | t-$C_5H_{11}O$ | t-$C_5H_{11}O$ |
| M-27 | H | t-$C_6H_{13}O$ | t-$C_6H_{13}O$ | t-$C_6H_{13}O$ |
| M-28 | H | i-$C_3H_7O$ | i-$C_3H_7O$ | i-$C_3H_7O$ |
| M-29 | H | $C_2F_5$ | $C_2F_5$ | $C_2F_5$ |
| M-30 | H | t-$C_4H_9$ | t-$C_4H_9$ | t-$C_4H_9$ |
| M-31 | H | $CH_3$\\CHO/F | $CH_3$\\CHO/F | $CH_3$\\CHO/F |
| M-32 | H | $(CH_3)_2CHCH_2CHO$ \| $CH_3$ | $(CH_3)_2CHCH_2CHO$ \| $CH_3$ | $(CH_3)_2CHCH_2CHO$ \| $CH_3$ |
| M-33 | H | $CH_3$—Ph—S | $CH_3$—Ph—S | $CH_3$—Ph—S |
| M-34 | H | t-$C_4H_9S$ | t-$C_4H_9S$ | t-$C_4H_9S$ |
| M-35 | | | | |

TABLE 2-continued
| | | | Formula (10) | |
|---|---|---|---|---|
| Compound | $R^5$ | $R^{22}$ | $R^{23}$ | $R^{24}$ |
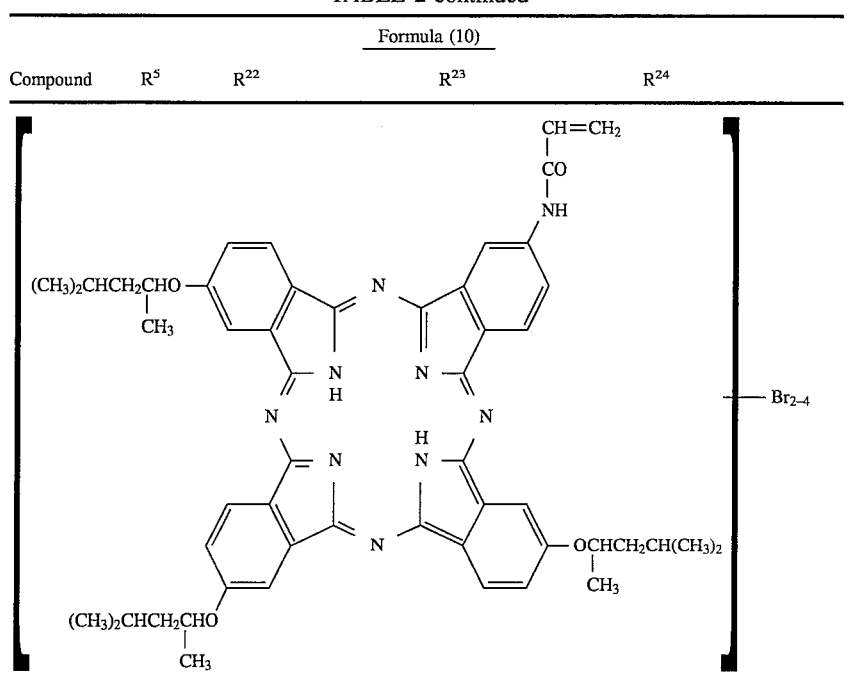
M-36
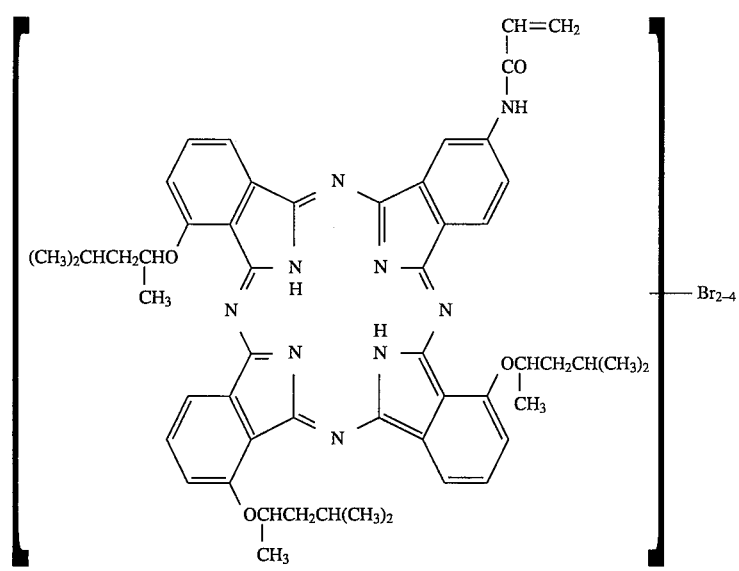
M-37

TABLE 2-continued

Formula (10)

| Compound | R⁵ | R²² | R²³ | R²⁴ |
|---|---|---|---|---|

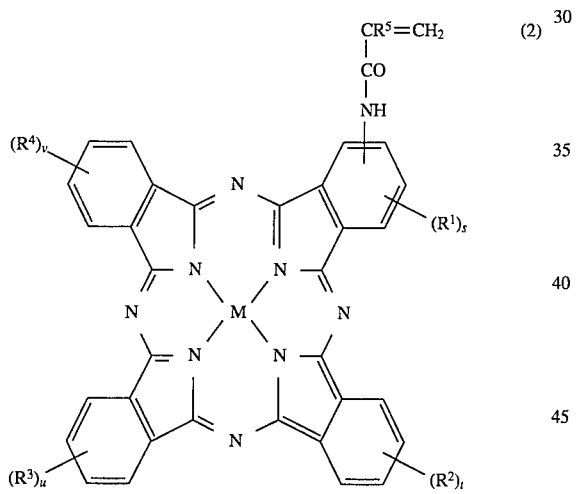

Next, the phthalocyanine compound of formula (2) is described.

In formula (2), $R^1$, $R^2$, $R^3$, $R^4$, $R^5$, s, t, u, and v are as defined in formula (1), with preferred examples thereof being the same.

M represents a metal atom. Included are metal atoms belonging to Groups 1 to 14 (Groups 1A to 7A, 8, and 1B to 4B) in the Periodic Table. Examples are Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn, and Pb. Among these, Li, Ti, V, Cr, Mn, Fe, Co, Ni, Pd, Cu, Zn, Al, and Si are preferred, Fe, Co, Ni, Pd, Cu, Zn and bin are more preferred, and Co, Pd, Cu, Zn, and bin are most preferred.

It will be understood that one or two ligands may coordinate to the metal atom from above and below. Exemplary Ligands include AlCl, InCl, InBr, InI, SiCl₂, SiBr₂, SiF₂, SnCl₂, SnBr₂, SnF₂, GeCl₂, GeBr₂, GeF₂, Si(OH)₂, Sn(OH)₂, Ge(OH)₂, Si(OR₁)₂ wherein R₁ is alkyl, VO, and TiO.

Preferred among the phthalocyanine compounds of formula (2) are those of formulae (9) to (11) wherein the hydrogen atoms (depicted) are replaced by a metal atom. Illustrative examples are those shown as M-1 to M-37 wherein the two hydrogen atoms are replaced by Fe, Co, Ni, Pd, Cu, Zn, and Mn, especially by Co, Pd, Cu, Zn, and Mn.

The phthalocyanine compounds of formulae (1) and (2) have a configuration that alkyl groups (especially bulky alkyl groups such as t-butyl groups), alkoxy groups, alkylthio groups or arylthio groups are attached to benzene rings of phthalocyanine. As compared with phthalocyanine compounds free of a specific substituent, the phthalocyanine compounds of formulae (1) and (2) are more soluble in such solvents as chloroform and acetone. Conventional phthalocyanine compounds have the nature that molecules are likely to associate with each other and are regarded as less soluble compounds probably because of this nature. Introduction of bulky alkyl groups or the like prohibits the molecule association, improving solubility. Consequently, the inventive phthalocyanine compounds are well suited as recording material for optical recording media such as write-once compact disks (CD-R). The coating solvent for use in forming a recording layer is preferably selected from solvents which do not attack polycarbonate resin commonly used as the substrates, for example, alcohols such as diacetone alcohol and ethyl cellosolve, aliphatic hydrocarbons such as hexane and octane, and fluorinated solvents such as fluorinated alcohols. The inventive phthalocyanine compounds have increased solubility in these solvents. By using such a coating solution, a recording layer can be coated to a sufficient thickness to ensure an acceptable sensitivity as recording media.

The phthalocyanine compounds having fluorinated alkyl or alkoxy groups as $R^1$ to $R^4$ have increased solubility in fluorinated solvents such as fluorinated alcohols which do not attack polycarbonate and acrylic resin substrates. These phthalocyanine compounds are resistant against degradation. Then they have an increased sensitivity as recording media.

The phthalocyanine compounds having alkoxy groups as $R^1$ to $R^4$ and halogenated ones thereof such as brominated ones have an increased index of refraction as recording material and hence, an increased sensitivity as recording media.

The optical recording medium, typically CD-R contemplated herein has a recording layer which is preferably 500 to 3,000 Å (50 to 300 nm) thick as measured in dry film thickness. Preferably the medium also has a metal reflecting layer disposed in close contact with the recording layer.

Since the phthalocyanine compounds of formulae (1) and (2) have a polymerizable vinyl group, they are useful as monomers for producing polymers.

The preparation of the phthalocyanine compound of formula (1) is described.

First, phthalonitrile compounds corresponding to the end phthalocyanine compound are selected among alkyl-, alkoxy-, alkylthio- or arylthio-substituted phthalonitriles, nitrophthalonitriles and the like. Predetermined amounts of phthalonitrile compounds are reacted in a non-aqueous solvent such as ethanol in the presence of a strong base catalyst such as 1,5-diazabicyclo[4,3,0]non-5-ene (DBN). The reaction product is purified to obtain a nitro-substituted phthalocyanine compound of formula (3). The reaction temperature is about 70° to 110° C. and the reaction time is about to about 48 hours. In general, reaction is effected under reflux.

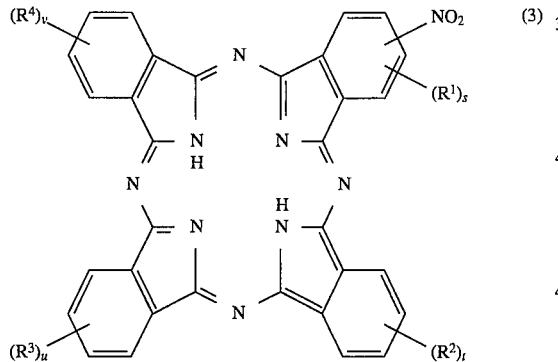

In formula (3), $R^1$ to $R^4$ and s to v are as defined in formula (1).

Alternatively, a nitro-substituted phthalocyanine compound of formula (3) may be prepared by reacting a halogenated phthalonitrile with a nitrophthalonitrile to form a halogenated nitro-substituted phthalocyanine compound and substituting a desired substituent for the halogen of the compound.

Then, the nitro group of the nitro-substituted phthalocyanine compound of formula (3) is reduced using a reducing agent such as $SnCl_2$ in a dispersing medium such as ethanol. The reaction product is purified to obtain an amino-substituted phthalocyanine compound of formula (4). In general, reaction is effected at a temperature of about 25° C. for a time of about 24 hours.

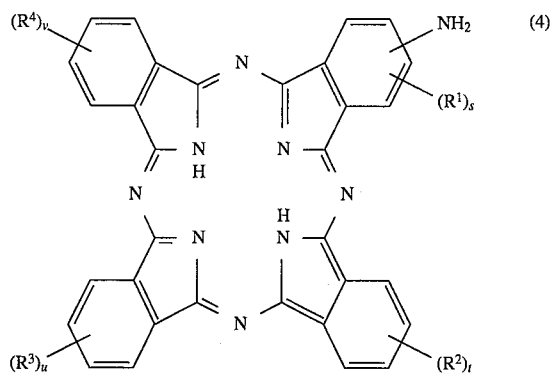

In formula (4), $R^1$ to $R^4$ and s to v are as defined in formula (1).

Next, the amino-substituted phthalocyanine compound of formula (4) is reacted with an acryloyl group-containing compound such as acryloyl chloride which is dependent on the end phthalocyanine compound. The reaction product is purified to obtain a phthalocyanine compound of formula (1) having an acryloyl group introduced therein. In general, reaction is effected in a non-aqueous solvent such as tetrahydrofuran (THF) in the presence of a base such as triethylamine. The reaction temperature is about 0° C. and the reaction time is about 2 hours.

A metal is introduced into the phthalocyanine compound of formula (1), nitro-substituted phthalocyanine compound of formula (3) or amino-substituted phthalocyanine compound of formula (4), for example, by mixing a 0.1M solution of a salt of the metal to be introduced (for example, an acetate, chloride, bromide, and carbonate, as well as Al-acetylacetonato complex or the like for Al to be introduced) with a 1M solution of the compound and maintaining the mixture at a temperature of about 100° C. for 24 hours for reaction, followed by purification. The reaction medium may be methanol, chloroform, pyridine, phenol or the like. Reaction is generally effected under reflux. In this way, the phthalocyanine compound of formula (1) is converted into a phthalocyanine compound of formula (2), and the compounds of formulae (3) and (4) are converted into corresponding compounds wherein the two hydrogen atoms are replaced by a metal.

These products are identifiable by infrared (IR) absorption spectroscopy, mass spectrometry, elemental analysis or visible absorption spectroscopy.

Most of the above-mentioned series of reactions are solution reactions using solvents while some use dispersion media. Since a metal-free phthalocyanine compound having bulky alkyl groups such as t-butyl groups or other specific substituents can be directly synthesized, the resulting compound is of high purity as compared with conventional methods including a synthesis method of reacting a metal salt with a phthalonitrile to form a metal phthalocyanine compound and a synthesis method of converting a Mg phthalocyanine into a metal-free form with the aid of HCl followed by replacement by another metal. The purity is about 80% in the conventional methods and increased to about 95 to 100% by the inventive method. Since the respective compounds obtained at several reaction stages are well soluble as compared with the conventional methods, purification is possible at each of the reaction stages, leading to higher purity. The intermediate products obtained in the process also have the same purity as mentioned above.

Solubility is increased because all the compounds have bulky alkyl groups or the like. More particularly, although conventional phthalocyanine compounds are insoluble in such solvents as chloroform and acetone at 25° C., the phthalocyanine compounds of the invention have a solubility of about 30% by weight in acetone and about 30 to 40% by weight in chloroform.

The metal phthalocyanine compound is obtained by once synthesizing a metal-free phthalocyanine compound and introducing a metal therein. This process enables introduction of almost all metals and a choice may be made from a wide variety of metal phthalocyanine compounds. Any metal phthalocyanine compound can be synthesized depending on a particular purpose and application.

For the phthalocyanine compounds having alkoxy groups as $R^1$ to $R^4$, a halogen may be introduced into a molecule thereof by synthesizing a phthalocyanine compound having an alkoxy group and reacting it with a halogenating agent such as bromine, cupric bromide, quaternary ammonium bromide, and N-bromosuccinic imide, especially bromine. The amount of the halogenating agent used may be determined in accordance with the amount of halogen to be introduced and usually, range from 1 to 6 moles per mole of the phthalocyanine compound. Under such conditions, one to four halogen atoms such as bromine atoms can be introduced. The reaction solvent used is selected from aliphatic hydrocarbons (e.g., n-hexane), halogenated hydrocarbons (e.g., dichloroethane), water or mixtures thereof. The reaction temperature is 20° to 120° C. In this regard, reference is made to JP-A 25179/1993.

In particular, the phthalocyanine compounds of formulae (1) and (2), nitro-substituted phthalocyanine compounds of formula (3), and amino-substituted phthalocyanine compounds of formula (4) as well as these compounds having a metal introduced therein are expected to find use as photofunctional material accommodating to a reduction in the wavelength of semiconductor lasers. More illustratively, these phthalocyanine compounds are well suited as recording material of optical recording media such as write-once compact disks CD-R). The phthalocyanine compounds have a solubility of about 1 to 12% by weight in n-hexane at 25° C. Those compounds obtained by replacing the nitro group of the nitro-substituted phthalocyanine compounds of formula (3) by a bulky alkyl group (e.g., t-butyl) or another specific substituent are also preferred as photo-functional material. Those compounds further having a metal introduced therein are also useful. These compounds are also useful as dyes for use in optical disks such as CD-R because they are well soluble in solvents which do not attack polycarbonate.

Preferred examples of the nitro- and amino-substituted phthalocyanine compounds of formulae (3) and (4) are those of formulae (12) and (13) corresponding to those of formula (9), those of formulae (14) and (15) corresponding to those of formula (10), and those of formulae (16) and (17) corresponding to those of formula (11). This structure is also advantageous for those compounds wherein the nitro group is replaced by a t-butyl group or another specific substituent. Preferred combinations of $R^{12}$, $R^{13}$, and $R^{14}$ as well as $R^{22}$, $R^{23}$, and $R^{24}$ are as described in Tables 1 and 2 for formulae (9) and (10). Preferred examples of the metal to be introduced are as previously described.

(12)

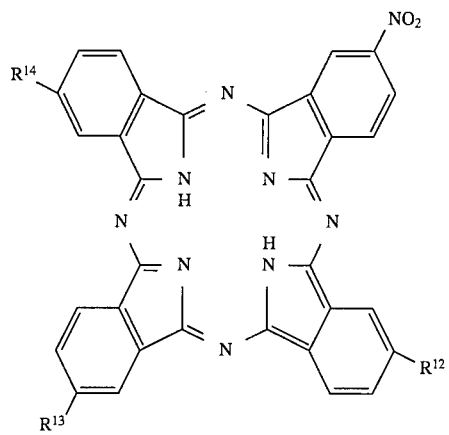

(13)

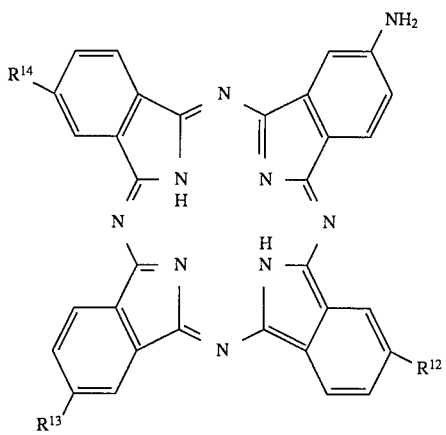

(14)

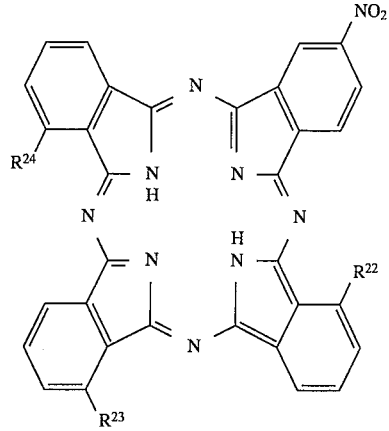

(15)

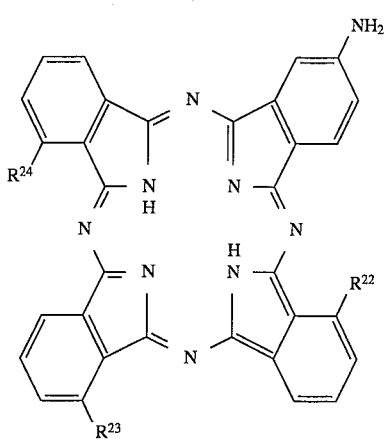

(16)

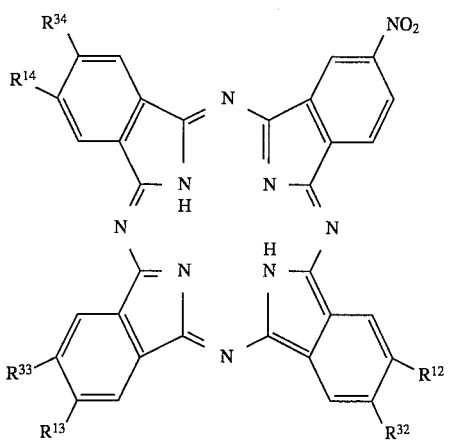

(17)

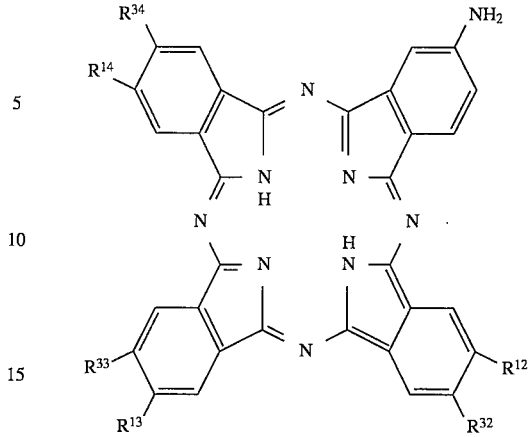

The present invention also provides a phthalocyanine-containing polymer having a structural unit of formula (5).

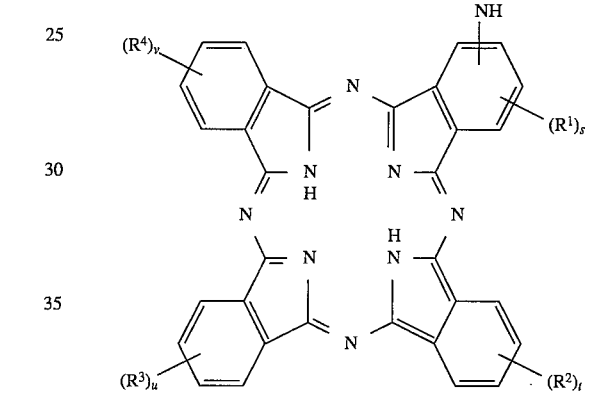

(5)

In formula (5), $R^1$ to $R^5$, s, t, u, and v are as defined in formula (1). The polymer may be a homopolymer in which recurring structural units are identical or a copolymer in which recurring structural units are different. Copolymers include copolymers consisting of structural units of formula (5) wherein the structural units are different since substituents like $R^1$ are different and copolymers of a structural unit of formula (5) combined with another monomeric component. The copolymers may be alternating copolymers, block copolymers or random copolymers.

The phthalocyanine-containing polymer has a number average molecular weight of about 2,500 to 30,000 and an average degree of polymerization of about 20 to 110. The polymer has a terminal group in the form of an alkyl group such as methyl.

Preferred examples of the polymers consisting of structural units of formula (5) are those of formulae (18), (19) and (20).

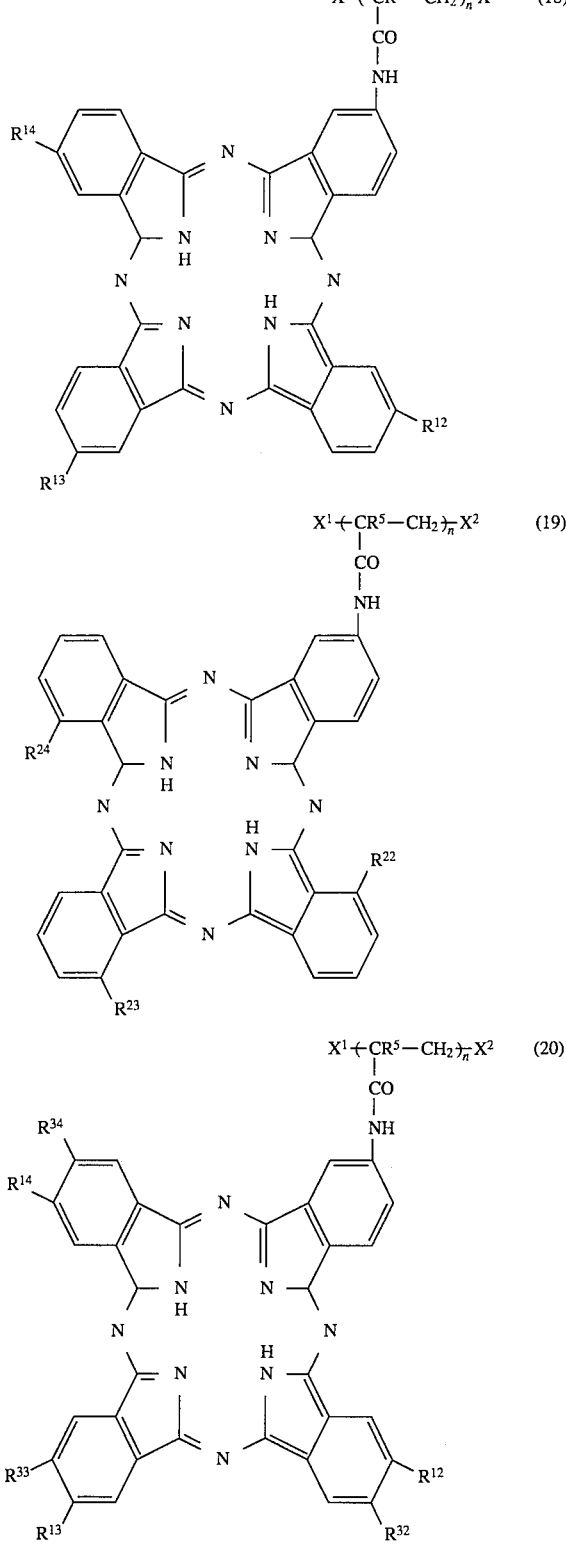

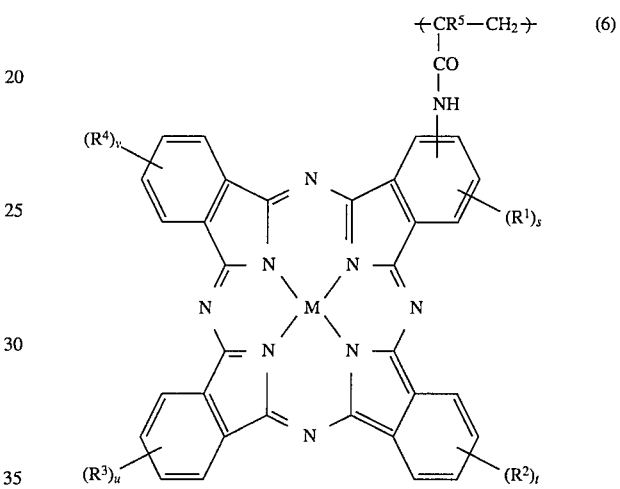

In formula (18), $R^{12}$, $R^{13}$, $R^{14}$, and $R^5$ are the same as defined for formula (9), with preferred combinations of R's being as mentioned for formula (9). In formula (19), $R^{22}$, $R^{23}$, $R^{24}$, and $R^5$ are the same as defined for formula (10), with preferred combinations of R's being as mentioned for formula (10). In formula (20), $R^{12}$ to $R^{14}$, $R^{32}$ to $R^{34}$, and $R^5$ are the same as defined for formula (11). Letter n represents an average degree of polymerization and ranges from about 25 to about 35. $X^1$ and $X^2$ each represent a terminal group which is an alkyl group such as methyl. The polymers of formulae (18), (19), and (20) have a number average molecular weight of about 20,000 to 30,000. Preferably the polymers of formulae (18), (19), and (20) are homopolymers.

The present invention also provides a metal phthalocyanine-containing polymer having a structural unit of formula (6).

The polymer of formula (6) is the same as that of formula (5) except that a metal is introduced into the phthalocyanine instead of the two hydrogen atoms. The same discussion as made on the polymer having a structural unit of formula (5) applies to the polymer having a structural unit of formula (6). Preferred compounds are the same as those of formulae (18), (19), and (20) wherein a metal atom M substitutes for the two hydrogen atoms. Illustrative examples are also the same.

The metal phthalocyanine-containing polymer has a number average molecular weight of about 20,000 to 30,000 and an average degree of polymerization of about 25 to 35. The polymer has a terminal group which is the same as mentioned above.

The metal phthalocyanine-containing polymers corresponding to formulae (18), (19) and (20) have a number average molecular weight of about 20,000 to 30,000 and n is about 25 to 35.

The phthalocyanine-containing polymers of the invention include copolymers containing a structural unit of formula (5) or (6) and another monomer component. Typical are copolymers having a structural unit of formula (7) corresponding to formula (5) and copolymers having a structural unit of formula (8) corresponding to formula (6).

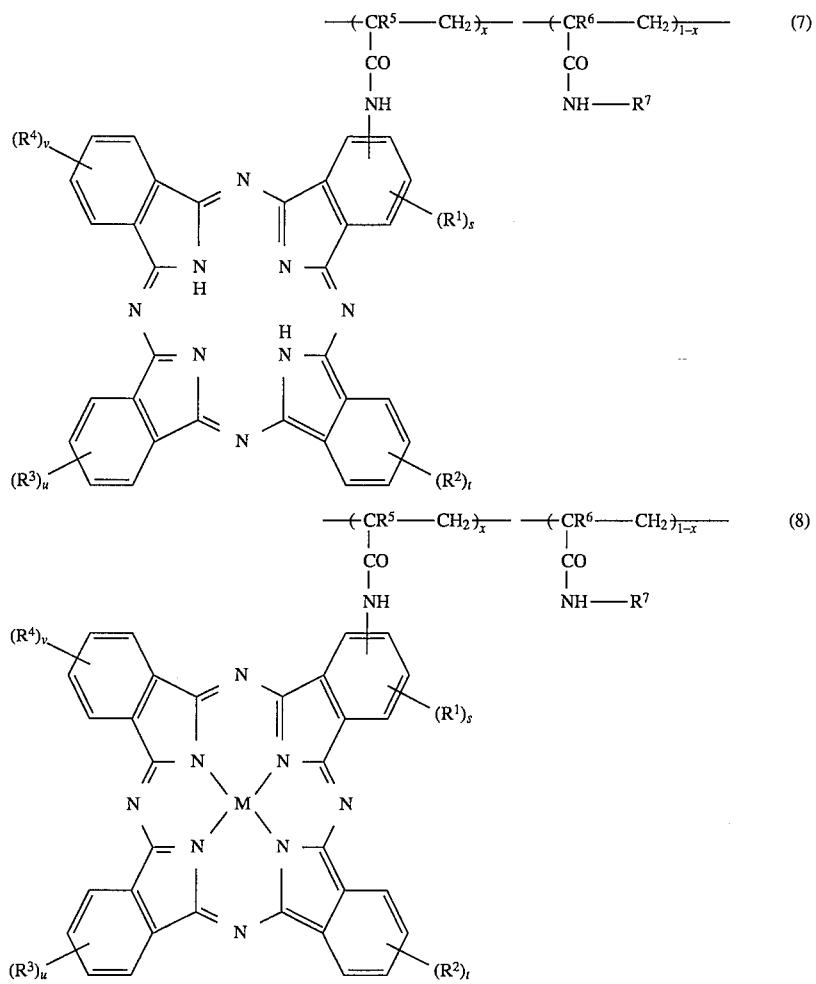

In formulae (7) and (8), $R^1$ to $R^5$, s, t, u, v and M are as defined in formulae (1) and (2). $R^6$ is as defined for $R^5$ in formula (1). $R^5$ and $R^6$ are often identical, but may be different. $R^7$ is a hydrogen atom or an alkyl group. The alkyl group represented by $R^7$ is preferably an unsubstituted alkyl group or an amino-substituted alkyl group in which the amino moiety may form a substituted ammonium salt. The alkyl group or the alkyl moiety of the amino-substituted alkyl group preferably has 1 to 18 carbon atoms. Examples are $-(CH_2)_3N(CH_3)_2$, $-(CH_2)_3N^+(CH_3)_3Cl^-$, and $-CH(CH_3)_2$. Letter x is a number meeting $0<x<1$, preferably ranging from 0.005 to 0.2.

The copolymer having a structure of formula (7) has a number average molecular weight of about 3,000 to 20,000 and an average degree of polymerization of about 30 to 100. The copolymer having a structure of formula (8) has a similar number average molecular weight and a similar average degree of polymerization. The copolymer of formula (7) or (8) has a terminal group which is the same as previously mentioned.

Preferred among the copolymers having a structure of formula (7) are those having a structure of formulae (21), (22) and (23).

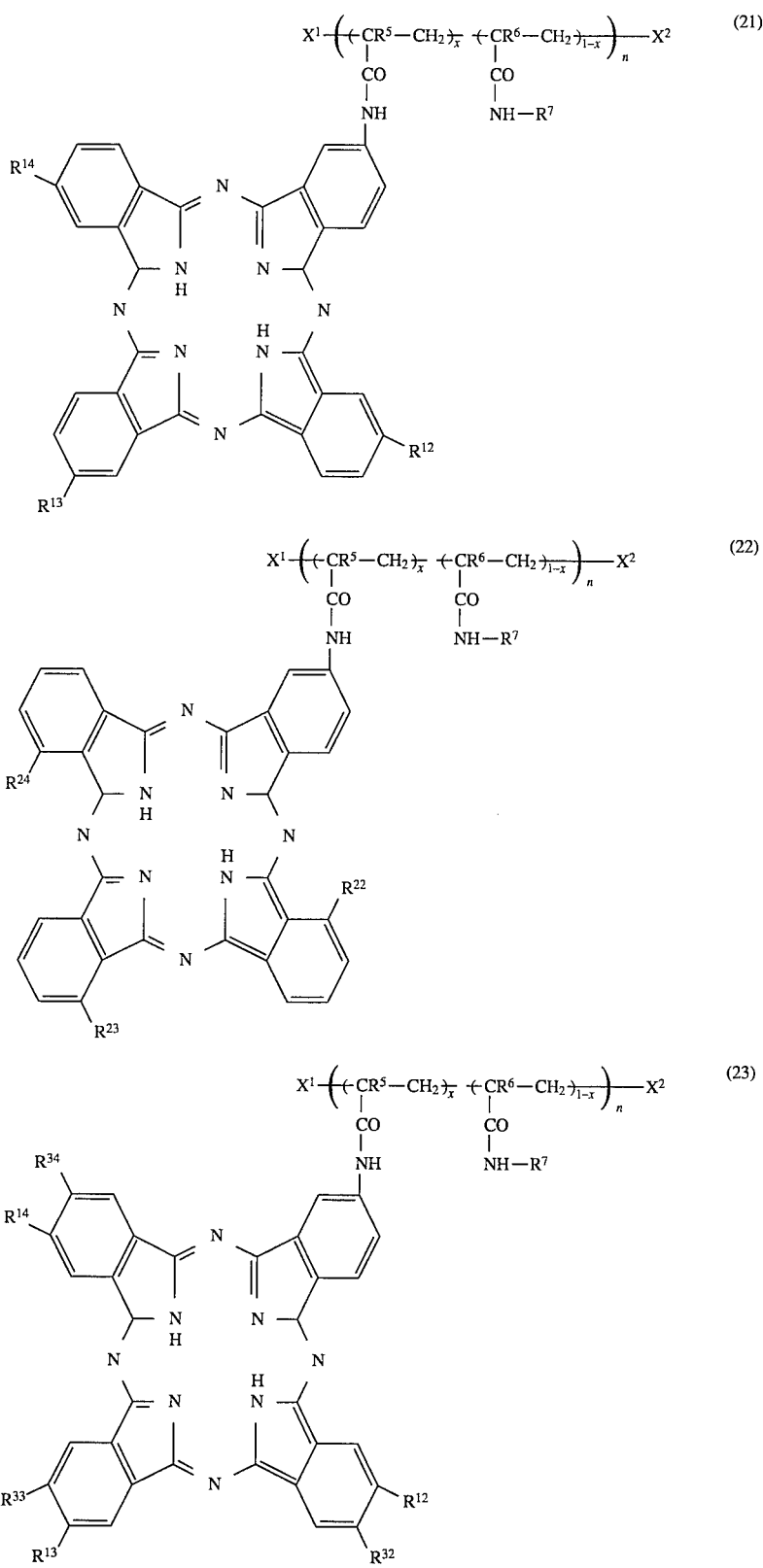

In formula (21) $R^{12}$, $R^{13}$, $R^{14}$, and $R^5$ are as defined in formula (9), with preferred combinations of R's being as mentioned for formula (9). In formula (22), $R^{22}$, $R^{23}$, $R^{24}$, and $R^5$ are as defined in formula (10), with preferred combinations of R's being as mentioned for formula (10). In formula (23), $R^{12}$ to $R^{14}$, $R^{32}$ to $R^{34}$, and $R^5$ are as defined in formula (11). In formulae (21), (22), and (23), $R^6$, $R^7$, and x are as defined in formula (7). Letter n representing an average degree of polymerization ranges from about 30 to about 100. $X^1$ and $X^2$ each represent a terminal group which is as previously defined.

The copolymers of formulae (21), (22) and (23) have a number average molecular weight as previously defined.

Illustrative examples of the copolymers of formulae (21), (22), and (23) are shown below as CP-1 through CP-23. Table 3 represents combinations of $R^{12}$, $R^{13}$, $R^{14}$, $R^5$, $R^6$, $R^7$, and x in formula (21). Table 4 represents combinations of $R^{22}$, $R^{23}$, $R^{24}$, $R^5$, $R^6$, $R^7$, and x in formula (22).

TABLE 3

| | Formula (21) | | | | | | |
|---|---|---|---|---|---|---|---|
| Copolymer | $R^{12}$ | $R^{13}$ | $R^{14}$ | $R^5$ | $R^6$ | $R^7$ | x |
| CP-1 | t-butyl | t-butyl | t-butyl | H | H | H | 0.01 |
| CP-2 | t-butyl | t-butyl | t-butyl | H | H | $-(CH_2)_3N(CH_3)_2$ | 0.1 |
| CP-3 | t-butyl | t-butyl | t-butyl | H | H | $-(CH_2)_3N^+(CH_3)_3Cl^-$ | 0.1 |
| CP-4 | t-butyl | t-butyl | t-butyl | $CH_3$ | $CH_3$ | $-(CH_2)_3N(CH_3)_2$ | 0.1 |
| CP-5 | t-butyl | t-butyl | t-butyl | H | H | $-CH(CH_3)_2$ | 0.01 |
| CP-6 | t-butoxy | t-butoxy | t-butoxy | H | H | H | 0.01 |
| CP-7 | 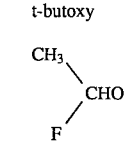 | 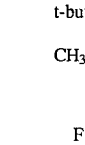 |  | H | H | $-(CH_2)_3N(CH_3)_2$ | 0.1 |
| CP-8 | $(CH_3)_2CHCH_2\underset{\underset{CH_3}{\mid}}{C}HO$ | $(CH_3)_2CHCH_2\underset{\underset{CH_3}{\mid}}{C}HO$ | $(CH_3)_2CHCH_2\underset{\underset{CH_3}{\mid}}{C}HO$ | $CH_3$ | $CH_3$ | $-(CH_2)_3N(CH_3)_2$ | 0.1 |
| CP-9 | $CH_3-Ph-S$ | $CH_3-Ph-S$ | $CH_3-Ph-S$ | H | H | $-(CH_2)_3N(CH_3)_2$ | 0.1 |
| CP-10 | $t-C_4H_9S$ | $t-C_4H_9S$ | $t-C_4H_9S$ | H | H | $-(CH_2)_3N(CH_3)_2$ | 0.1 |

TABLE 4

| | Formula (22) | | | | | | |
|---|---|---|---|---|---|---|---|
| Copolymer | $R^{22}$ | $R^{23}$ | $R^{24}$ | $R^5$ | $R^6$ | $R^7$ | x |
| CP-11 | t-butyl | t-butyl | t-butyl | H | H | H | 0.01 |
| CP-12 | t-butyl | t-butyl | t-butyl | H | H | $-(CH_2)_3N(CH_3)_2$ | 0.1 |
| CP-13 | t-butyl | t-butyl | t-butyl | H | H | $-(CH_2)_3N^+(CH_3)_3Cl^-$ | 0.1 |
| CP-14 | t-butyl | t-butyl | t-butyl | $CH_3$ | $CH_3$ | $-(CH_2)_3N(CH_3)_2$ | 0.1 |
| CP-15 | t-butyl | t-butyl | t-butyl | H | H | $-CH(CH_3)_2$ | 0.01 |
| CP-16 | t-butoxy | t-butoxy | t-butoxy | H | H | H | 0.01 |
| CP-17 | 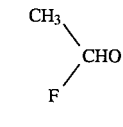 | 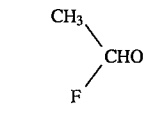 |  | H | H | $-(CH_2)_3N(CH_3)_2$ | 0.1 |
| CP-18 | $(CH_3)_2CHCH_2\underset{\underset{CH_3}{\mid}}{C}HO$ | $(CH_3)_2CHCH_2\underset{\underset{CH_3}{\mid}}{C}HO$ | $(CH_3)_2CHCH_2\underset{\underset{CH_3}{\mid}}{C}HO$ | $CH_3$ | $CH_3$ | $-(CH_2)_3N(CH_3)_2$ | 0.1 |
| CP-19 | $CH_3-Ph-S$ | $CH_3-Ph-S$ | $CH_3-Ph-S$ | H | H | $-(CH_2)_3N(CH_3)_2$ | 0.1 |
| CP-20 | $t-C_4H_9S$ | $t-C_4H_9S$ | $t-C_4H_9S$ | H | H | $-(CH_2)_3N(CH_3)_2$ | 0.1 |
| CP-21 | | | | | | | |

TABLE 4-continued

| | | Formula (22) | | | | | |
|---|---|---|---|---|---|---|---|
| Copolymer | $R^{22}$ | $R^{23}$ | $R^{24}$ | $R^5$ | $R^6$ | $R^7$ | x |

CP-22:

$$X^1\!\!-\!\!\left(\!\!\left(\!\!\begin{array}{c}CH_3\\C\!-\!CH_2\\CO\\NH\end{array}\!\!\right)_{\!\!0.1}\!\!\left(\!\!\begin{array}{c}CH_3\\C\!-\!CH_2\\CO\\NH\!-\!(CH_2)_3N(CH_3)_2\end{array}\!\!\right)_{\!\!0.9}\!\!\right)_{\!n}\!\!-\!\!X^2$$

[phthalocyanine macrocycle with (CH$_3$)$_2$CHCH$_2$CHO(CH$_3$)— and —OCHCH$_2$CH(CH$_3$)$_2$(CH$_3$) substituents] — Br$_{2-4}$

CP-23:

$$X^1\!\!-\!\!\left(\!\!\left(\!\!\begin{array}{c}CH_3\\C\!-\!CH_2\\CO\\NH\end{array}\!\!\right)_{\!\!0.1}\!\!\left(\!\!\begin{array}{c}CH_3\\C\!-\!CH_2\\CO\\NH\!-\!(CH_2)_3N(CH_3)_2\end{array}\!\!\right)_{\!\!0.9}\!\!\right)_{\!n}\!\!-\!\!X^2$$

[phthalocyanine macrocycle with (CH$_3$)$_2$CHCH$_2$CHO(CH$_3$)— and —OCHCH$_2$CH(CH$_3$)$_2$(CH$_3$) substituents] — Br$_{2-4}$ TABLE 4-continued Formula (22)

| Copolymer | R²² | R²³ | R²⁴ | R⁵ | R⁶ | R⁷ | x |
|---|---|---|---|---|---|---|---|

$$X^1 - \left( \left( CH-CH_2 \right)_{0.1} - \left( CH-CH_2 \right)_{0.9} \right)_n - X^2$$
with CO-NH- side chains bearing the phthalocyanine (substituted with t-C₄H₉S groups) and CO-NH-(CH₂)₃N(CH₃)₂

---

Preferred among the copolymers having a structure of formula (8) are those of formulae (21), (22), and (23) wherein a metal atom is introduced as previously mentioned. Illustrative examples are those shown as CP-1 through CP-23 with the two hydrogen atoms replaced by Co, Pd, Zn, Cu, and Mn.

Metal phthalocyanine-containing copolymers corresponding to formulae (21), (22), and (23) have a similar number average molecular weight and a similar value of n and the remainings are as defined for formulae (21), (22), and (23).

The inventive phthalocyanine-containing copolymer containing another monomer component is not limited to those represented by formulae (7) and (8) and may contain any desired monomer component. Such other monomer components include vinyl pyridine, vinyl carbazole, styrene, N-vinylpyrrolidone, vinyl chloride, vinylidene chloride, vinyl fluoride, vinylidene fluoride, vinyl methyl ether, vinyl acetate, acrylic acid, methacrylic acid and derivatives thereof (e.g., acrylonitrile and phosphate-containing acrylic monomers), maleic anhydride, and ethylene.

The proportion of monomer component, number average molecular weight, degree of polymerization, terminal group and the like of these copolymers are the same as previously described for the phthalocyanine copolymers.

The phthalocyanine-containing polymer of formula (5) is prepared by polymerizing a phthalocyanine compound of formula (1) followed by purification. Polymerization may be effected using a non-aqueous solvent such as benzene and a radical initiator such as α,α'-azobisisobutyronitrile (AIBN). The reaction temperature is about 60° C. and the reaction time is about 20 to 48 hours.

The copolymer containing another monomer component as represented by formula (7) is prepared by similar reaction with a monomer component such as an acrylamide derivative being added.

The metal phthalocyanine-containing polymer as represented by formula (6) or (8) is obtained by substituting a metal atom for the two hydrogen atoms of the phthalocyanine of the above-prepared polymer of formula (5) or (7).

For substitution of metal atom M, a solution of a salt of the desired metal is added to a solution of the polymer followed by mixing as previously mentioned. At this point, the metal salt solution has a concentration of about 1M and the polymer solution has about 0.1M. The reaction medium may be methanol, chloroform, pyridine, phenol or a mixture thereof with water. The reaction temperature is about 100° C. and the reaction time is about 24 hours.

By such reaction, the metal atom M is introduced into about 90 to 100% by weight of the phthalocyanine in the polymer.

Preferably, a metal phthalocyanine-containing polymer as represented by formula (6) or (8) is obtained by Once synthesizing a metal-free phthalocyanine-containing polymer and introducing a metal atom M into the polymer. On the contrary, if a metal phthalocyanine compound is subject to radical polymerization, radical growth is inhibited. Therefore, a polymer having a higher degree of polymerization and a higher molecular weight is obtained from the route of polymerizing a metal-free compound. As compared with the route of polymerizing a metal phthalocyanine compound, the route of polymerizing a metal-free compound is easy to control the orientation of phthalocyanine rings to form a linear polymer because of the eliminated interaction between metal atoms. This also provides the advantage that the metal to be introduced into phthalocyanine can be selected from a wider range and the content of metal phthalocyanine is increased.

Nevertheless, it is possible in some cases to prepare a metal phthalocyanine-containing polymer by polymerizing a metal phthalocyanine compound of formula (2). When such a route is selected, a regular arrangement of phthalocyanine rings is expectable. Furthermore, by using a metal-free phthalocyanine compound and a metal phthalocyanine compound in suitable combination as starting monomers, formation of a branched polymer or a three-dimensional polymer can be promoted or suppressed such that a desired polymer may be obtained.

The phthalocyanine-containing polymers of the invention can be identified by IR spectroscopy, mass spectrometry, elemental analysis, and visible absorption spectroscopy. The number average molecular weight and average degree of polymerization can be determined by gel permeation chromatography (GPC).

The thus obtained phthalocyanine-containing polymers, especially metal phthalocyanine-containing polymers have many advantages over the conventional ones including a higher content of phthalocyanine, easy control of orientation of phthalocyanine rings, high purity, and increased solubility.

Especially the copolymer of formula (8) is water soluble as long as x ranges from 0.005 to 0.2 and its solubility in water at 25° C. is equivalent to that of conventional acrylamide polymers. That is, there are obtained water soluble phthalocyanine-containing polymers.

A comparison of solubility in chloroform at 25° C. among various phthalocyanine-containing polymers inside and outside the scope of the invention reveals that most conventional polymers have a solubility of 0% whereas the inventive polymers have a solubility of about 30 to 40% by weight, indicating increased solubility.

For these reasons, the phthalocyanine-containing polymers, especially metal phthalocyanine-containing polymers of the present invention are expected to be chemically stable functional materials which will find use in light absorption, electric conduction, photo-conduction, energy conversion, electrode and catalyst.

Especially, the metal phthalocyanine-containing copolymers of formula (8) are water soluble and as long as x ranges from 0.005 to 0.2, constitute catalysts like enzymes for oxidation reaction of thiols and catalysts like catalase for decomposition of hydrogen peroxide.

Like the monomers, the phthalocyanine-containing polymers of the invention are well suited as recording material for optical recording media such as write-once compact disks. In such write-once compact disks, the polymers as such permit the recording layer to have an optimum thickness in grooves without the aid of an additional synthetic resin or cellulose.

EXAMPLE

Examples of the present invention are given below by way of illustration and not by way of limitation.

Example 1

Synthesis of a nitro-substituted phthalocyanine compound of formula (12) wherein $R^{12}=R^{13}=R^{14}=$t-butyl group In 100 ml of ethanol were dissolved 10 grams (0.054 mol) of 4-t-butylphthalonitrile of formula (24) and 4.7 grams (0.027 mol) of 4-nitrophthalonitrile of formula (25).

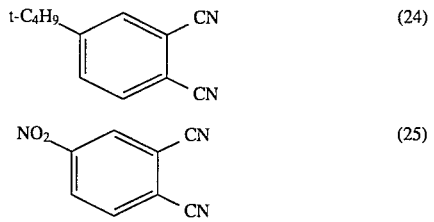

The solution was heated and refluxed for 24 hours in nitrogen in the presence of 10.1 grams of 1,5-diazabicyclo [4,3,0]non-5-ene (DBN) catalyst, precipitating a product. The heating temperature was about 100° C. The precipitated product was dissolved in chloroform (CHCl$_3$) and purified with silica gel, obtaining an end product designated Compound A in a yield of 4.5 grams (30%).

This compound was 99% pure. In elemental analysis, the found values were well coincident with the calculated values. The results of IR spectroscopy (KBr tablet method) were:

1520 cm$^{-1}$ (ν NO$_2$)
1340 cm$^{-1}$ (δ NO$_2$)

Other nitro-substituted phthalocyanine compounds of formula (12) wherein the combination of $R^{12}$, $R^{13}$, and $R^{14}$ was changed as given by M-2 to M-6, M-12 and M-13 in Table 1 were similarly synthesized. These compounds were similarly identified.

These nitro-substituted phthalocyanine compounds had a solubility of about 30% by weight in acetone at 25° C.

Example 2

In 10 ml of CHCl$_3$ was dissolved 2.0 grams (2.87×10$^{-3}$ mol) of Compound A obtained in Example 1. To the solution was added 5 ml of a methanol solution of 2.87×10$^{-2}$M copper acetate. The mixed solution was heated and refluxed at 100° C. for 24 hours, obtaining a compound having copper introduced into the phthalocyanine ring, designated Compound B. The end of reaction was confirmed by visible absorption spectroscopy. Compound B was purified by recrystallizing from chloroform/n-hexane. The yield was 1.8 grams (80%). The purity was 100%.

In elemental analysis, the found values were well coincident with the calculated values. The results of IR spectroscopy were:

| |
|---|
| 1520 cm$^{-1}$ (ν NO$_2$) |
| 1340 cm$^{-1}$ (δ NO$_2$) |
| 3200 cm$^{-1}$ (ν NH disappeared) |

The synthesis of Compound B was repeated except that the copper acetate was replaced by cobalt acetate, zinc acetate, and palladium acetate (or palladium chloride), obtaining compounds having cobalt, zinc, and palladium incorporated therein, respectively. These compounds were similarly identified and had a purity equivalent to that of Compound B.

By similarly introducing copper, cobalt and zinc into the compounds of Example 1 other than Compound A, compounds similar to Compound B were obtained. These compounds were similarly identified and had a purity equivalent to that of Compound B.

These compounds had a solubility of about 30% in acetone at 25° C.

Example 3

Synthesis of an amino-substituted phthalocyanine compound of formula (13) wherein $R^{12}=R^{13}=R^{14}=$t-butyl group Compound A obtained in Example 1, 2.0 grams (2.87'10$^{-3}$ mol), was dispersed in 30 ml of a solvent mixture of ethanol and HCl (volume ratio 2/1) in an ice bath. An ethanol solution of 4.42×10$^{-2}$M SnCl$_2$.2H$_2$O was added dropwise to the dispersion. After 24 hours, the reaction mixture was neutralized with aqueous ammonia, precipitating a product. The precipitated product was dissolved in CHCl$_3$ and purified with active alumina, obtaining an end product designated Compound C in a yield of 0.4 grams (20%).

This compound was approximately 100% pure. In elemental analysis, the found values were well coincident with the calculated values. The results of IR spectroscopy and mass spectrum were shown below.

IR 3250 cm$^{-1}$ (ν NH$_2$)

Mass spectrum m/e 697 (M+1)

Other amino-substituted phthalocyanine compounds of formula (13) wherein the combination of R$^{12}$, R$^{13}$, and R$^{14}$ was changed as in Table 1 were similarly synthesized from the other nitro-substituted phthalocyanine compounds of Example 1. These compounds were similarly identified and had an equivalent purity.

These amino-substituted phthalocyanine compounds had a solubility of about 30 to 40% by weight in chloroform at 25° C.

Example 4

As in Example 2, copper, cobalt, zinc, and palladium were introduced into the amino-substituted phthalocyanine compounds of Example 3. The resulting compounds were similarly identified.

These compounds had a purity of 99% and a solubility of about 30 to 40% in chloroform at 25° C.

Example 5

Synthesis of a phthalocyanine compound of formula (9) (M-1 in Table 1)

Compound C synthesized in Example 3, 1.0 grams (1.43× 10$^{-3}$ mol) was dissolved in 50 ml of tetrahydrofuran (THF) in an ice bath and reacted with 0.3 grams (3.33×10$^{-3}$ mol) of acryloyl chloride in the presence of triethylamine. After 2 hours, the THF was distilled off, obtaining a reaction product. The product was dissolved in dichloromethane and purified with active alumina. The product was further dissolved in CHCl$_3$ and methanol was added dropwise to the solution. By recrystallization an end product (Compound M-1) was recovered in a yield of 0.8 grams (70%). It was approximately 100% pure.

|  | Elemental analysis | | |
| --- | --- | --- | --- |
|  | C | H | N |
| Calcd. (%) | 75.23 | 5.87 | 16.80 |
| Found (%) | 74.84 | 5.77 | 16.53 |
| IR |  |  |  |

1650 cm$^{-1}$ (ν C=O)
1625 cm$^{-1}$ (ν C=C)
800 cm$^{-1}$ (δ C=C—H)

Mass spectrum m/e 751 (M + 1)

Like Compound M-1, the remaining compounds in Table 1, M-2 to M-6, M-12, and M-13 were synthesized. They were similarly identified and had an equivalent purity.

These phthalocyanine compounds had a solubility of about to 40% by weight in chloroform at 25° C.

Example 6

As in Example 2, copper, cobalt, zinc, and palladium were introduced into the phthalocyanine compounds of Example 5. The resulting compounds were similarly identified.

These compounds had a purity of 99% and a solubility of about 30 to 40% in chloroform at 25° C.

Example 7

Synthesis of polymer of formula (18) wherein R$^{12}$=R$^{13}$=R$^{14}$=t-butyl group, R$^5$=H, X$^1$=X$^2$=CH$_3$ To a benzene solution of 0.5M Compound M-1 of Example 5, AIBN was added in an amount of 2% by weight. The solution was heated and refluxed for 24 hours. The heating temperature was 60° C. After polymerization reaction, an end product designated Polymer P-1 was purified by re-precipitation. The yield was 0.18 grams (24%).

The polymer was approximately 100% pure and had a number average molecular weight of 20,000 to 30,000 and an average degree of polymerization (n) of 25 to 35.

|  | Elemental analysis | | |
| --- | --- | --- | --- |
|  | C | H | N |
| Calcd. (%) | 75.23 | 5.87 | 16.80 |
| Found (%) | 74.84 | 5.77 | 16.53 |
| IR |  |  |  |

1650 cm$^{-1}$ (ν C=O)
1625 cm$^{-1}$ (ν C=C) disappeared

Like Compound M-1, the remaining compounds in Table 1, M-2 to M-6, M-12 and M-13 were used as a starting monomer and similarly polymerized to produce polymers. The polymers were similarly identified. The polymers had the same terminal groups as mentioned above. The polymers had a number average molecular weight of 20,000 to 30,000 and an average degree of polymerization of 25 to 35.

The polymers had a solubility of 30 to 40% by weight in chloroform at 25° C. The purity was of the same order as above.

Example 8

To a chloroform solution of 2.87×10$^{-3}$M Polymer P-1 synthesized in Example 7, a methanol solution of 2.87×10$^-$ $_2$M zinc acetate was added. The solution was heated and refluxed for 24 hours at a temperature of 100° C. There was obtained a polymer having zinc incorporated into the phthalocyanine, designated Polymer PM-1. It was purified as in Example 7. The yield was 1.8 grams (70%).

The end of reaction was confirmed by visible absorption spectroscopy as in Example 2. Polymer PM-1 had a metal substitution of about 97% by weight. It was approximately 100% pure and had a number average molecular weight of 20,000 to 30,000 and an average degree of polymerization of 25 to 35. The terminal group was the same as in Example 7.

In elemental analysis, the found values were well coincident with the calculated values. The results of IR spectroscopy were shown below.

IR 1650 cm$^{-1}$ (ν C=O)

Polymers were prepared by the same procedure as Polymer PM-1 except that zinc was replaced by copper, cobalt and palladium. These polymers were similarly identified.

Similarly, copper, cobalt, zinc, and palladium were introduced into the polymers of Example 7 other than Polymer P-1, obtaining polymers similar to Polymer PM-1. They were similarly identified.

With respect to purity, metal substitution, and terminal group, these polymers were the same as Polymer PM-1.

They had a number average molecular weight of 20,000 to 30,000 and an average degree of polymerization of 25 to 35.

The polymers had a solubility of 30 to 40% by weight in chloroform at 25° C.

Example 9

Synthesis of a copolymer of formula (21) (CP-1 in Table 3, $X^1=X^2=CH_3$)

A benzene solution of 0.5M Compound M-1 synthesized in Example 5 was mixed with a dimethylformamide (DMF) solution of 0.01M $CH_2=CH-CO-NH_2$. AIBN was added to the solution in an amount of 2% by weight. The solution was heated and refluxed at 60° C. for 24 hours, obtaining an end product. It was purified by repeating dialysis and filtration. The yield was 1.77 grams (85%).

The copolymer was approximately 100% pure and had a number average molecular weight of 3,000 to 20,000 and an average degree of polymerization (n) of 30 to 100.

The results of elemental analysis are given below.

|  | C | H | N |
|---|---|---|---|
| Calcd. (%) | 47.88 | 7.30 | 17.37 |
| Found (%) | 47.44 | 7.26 | 17.36 |

The solubility of the copolymer in water at 25° C. was as high as acrylamide polymers.

Example 10

Synthesis of a copolymer of formula (21) (CP-2 in Table 3, $X^1=X^2=CH_3$)

Example 9 was repeated except that $CH_2=CH-CO-(CH_2)_3N(CH_3)_2$ was used instead of $CH_2=CH-CO-NH_2$. An end copolymer was obtained in a yield of 0.26 grams (10%).

The copolymer was approximately 100% pure and had a number average molecular weight of 3,000 to 20,000 and an average degree of polymerization (n) of 30 to 100.

| Elemental analysis | | | |
|---|---|---|---|
|  | C | H | N |
| Calcd. (%) | 63.84 | 8.72 | 17.53 |
| Found (%) | 63.32 | 8.65 | 17.77 |
| IR | | | |
| 1650 cm$^{-1}$ (ν C=O) | | | |

The solubility of the copolymer in water at 25° C. was the same as in Example 9.

Example 11

Synthesis of a copolymer of formula (21) (CP-3 in Table 3, $X^1=X^2=CH_3$)

Example 9 was repeated except that $CH_2=CH-CO-(CH_2)_3N^+(CH_3)_3Cl^-$ was used instead of $CH_2=CH-CO-NH_2$. An end copolymer was obtained in a yield of 0.26 grams (10%).

The copolymer was approximately 100% pure and had a number average molecular weight of 3,000 to 20,000 and an average degree of polymerization (n) of 30 to 100.

| Elemental analysis | | | |
|---|---|---|---|
|  | C | H | N |
| Calcd. (%) | 63.84 | 8.72 | 17.53 |
| Found (%) | 63.32 | 8.65 | 17.77 |
| IR | | | |
| 1650 cm$^{-1}$ (ν C=O) | | | |

The solubility of the copolymer in water at 25° C. was the same as in Example 9.

Example 12

Synthesis of a copolymer of formula (21) (CP-5 in Table 3, $X^1=X^2=CH_3$)

Example 9 was repeated except that $CH_2=CH-CO-NH-CH(CH_3)_2$ was used instead of $CH_2=CH-CO-NH_2$. An end copolymer was obtained in a yield of 0.8 grams (82%).

The copolymer was approximately 100% pure and had a number average molecular weight of 3,000 to 20,000 and an average degree of polymerization (n) of 30 to 100.

| Elemental analysis | | | |
|---|---|---|---|
|  | C | H | N |
| Calcd. (%) | 72.90 | 14.33 | 10.73 |
| Found (%) | 71.80 | 14.20 | 10.21 |
| IR | | | |
| 1650 cm$^{-1}$ (ν C=O) | | | |

The solubility of the copolymer in water at 25° C. was the same as in Example 9.

Example 13

To an aqueous solution containing 0.1 gram of Copolymer CP-1 obtained in Example 9 was added a methanol solution of 4.02×10$^{-5}$M cobalt acetate. There was obtained a copolymer CPM-1 having cobalt introduced into phthalocyanine. The end of reaction was confirmed by visible absorption spectroscopy as in Example 8. The copolymer was purified by dialysis. The yield was 0.097 gram (90%).

Copolymer CPM-1 had a metal substitution of about 97% by weight, a purity of 97%, a number average molecular weight of 3,000 to 20,000, and an average degree of polymerization of 30 to 100. The terminal groups were the same as in Example 9.

In elemental analysis, the found values were well coincident with the calculated values.

The solubility of Copolymer CPM-1 in water at 25° C. was the same as in Example 9.

Example 14

To an aqueous solution containing 0.1 gram of Copolymer CP-1 obtained in Example 9 was added a methanol solution of 0.1M manganese acetate. There was obtained a copolymer CPM-1' having manganese introduced into phthalocyanine. The end of reaction was confirmed by visible absorption spectroscopy as in Example 8. The copolymer was purified by dialysis. The yield was 0.096 gram (90%).

Copolymer CPM-1' had a metal substitution of about 97% by weight, a purity of 97%, a number average molecular weight of 3,000 to 20,000, and an average degree of polymerization of 30 to 100. The terminal groups were the same as in Example 9.

| | Elemental analysis | | |
|---|---|---|---|
| | C | H | N |
| Calcd. (%) | 52.65 | 6.85 | 19.21 |
| Found (%) | 52.74 | 7.00 | 18.10 |
| IR 1650 cm$^{-1}$ (ν C=O) | | | |

The solubility of Copolymer CPM-1' in water at 25° C. was the same as in Example 9.

Example 15

Example 13 was repeated except that Copolymer CP-2 obtained in Example 10 was used, obtaining a copolymer CPM-2 having cobalt introduced into phthalocyanine. The yield was 0.11 gram (90%).

Copolymer CPM-2 had a metal substitution of about 97% by weight, a purity of 97%, a number average molecular weight of 3,000 to 20,000, and an average degree of polymerization of 30 to 100. The terminal groups were the same as in Example 10.

In elemental analysis, the found values were well coincident with the calculated values.

The solubility of Copolymer CPM-2 in water at 25° C. was the same as in Example 10.

Example 16

Example 13 was repeated except that Copolymer CP-3 obtained in Example 11 was used, obtaining a copolymer CPM-3 having cobalt introduced into phthalocyanine. The yield was 0.094 gram (88%).

Copolymer CPM-3 had a metal substitution of about 97% by weight, a purity of 97%, a number average molecular weight of 3,000 to 20,000, and an average degree of polymerization of 30 to 100. The terminal groups were the same as in Example 11.

| | Elemental analysis | | |
|---|---|---|---|
| | C | H | N |
| Calcd. (%) | 58.84 | 8.72 | 14.48 |
| Found (%) | 58.14 | 8.83 | 14.63 |
| IR 1650 cm$^{-1}$ (ν C=O) | | | |

The solubility of Copolymer CPM-3 in water at 25° C. was the same as in Example 11.

Example 17

Example 13 was repeated except that Copolymer CP-5 obtained in Example 12 was used, obtaining a copolymer CPM-5 having cobalt introduced into phthalocyanine. The yield was 0.082 gram (90%).

Copolymer CPM-5 had a metal substitution of about 97% by weight, a purity of 97%, a number average molecular weight of 3,000 to 20,000, and an average degree of polymerization of 30 to 100. The terminal groups were the same as in Example 12.

In elemental analysis, the found values were well coincident with the calculated values.

The solubility of Copolymer CPM-5 in water at 25° C. was the same as in Example 12.

Example 18

Oxidation of 2-mercaptoethanol was carried out using Copolymers CPM-1, CPM-2, and CPM-3 synthesized in Examples 13, 15, and 16 as a catalyst.

The conditions included a catalyst concentration of $5.02 \times 10^{-7}$ mol/liter, an initial concentration of 2-mercaptoethanol of 0.05 mol/liter, an initial concentration of oxygen of $2.38 \times 10^{-4}$ mol/liter, pH 7.0, and 26° C.

The catalyst activity was calculated from the amount of oxygen consumed measured by a Warburg's manometer. The results are shown in FIG. 1. As seen from FIG. 1, 2-mercaptoethanol was quickly oxidized in the presence of Copolymers CPM-2 and CPM-3 which were cationic polymer electrolytes (as shown by triangles Δ in FIG. 1). Charge-free copolymer CPM-1 was little active (as shown by circles o in FIG. 1). This is probably because of promoted dissociation of 2-mercaptoethanol or substrate into a thiol anion by cationic charges in the vicinity of the complex and concentration of the substrate by electrostatic attractive force. This presumption is supported by the fact that addition of chloride ion to Copolymer CPM-2 inhibited activity (as shown by squares □ in FIG. 1). The chlorine concentration was 0.5 mol/liter.

Since this catalyst system followed Michaelis-Menten equation regarding the substrate concentration, the turnover number and apparent Michaelis constant could be obtained from a Lineweaver-Burk plot. It is thus evident that Copolymers CPM-2 and CPM-3 synthesized herein in the form of a polymeric complex act as an enzyme-like catalyst for oxidation reaction of a thiol because activity is substantially increased by adjacent electric charges.

The catalyst activity by adjacent electric charges is also confirmed by the pH dependency of respective copolymers. More particularly, as the concentration of a thiolate anion resulting from dissociation of 2-mercaptoethanol (pKa= 9.60) increases, a cationic electric charge is reduced. Then CPM-2 lowered activity whereas quaternary CPM-3 experienced no activity lowering.

Further using CPM-5 synthesized in Example 17 and the cationic charge-free copolymer CPM-1, catalytic activity was observed under conditions allowing dissociation of the substrate.

Figure 2:
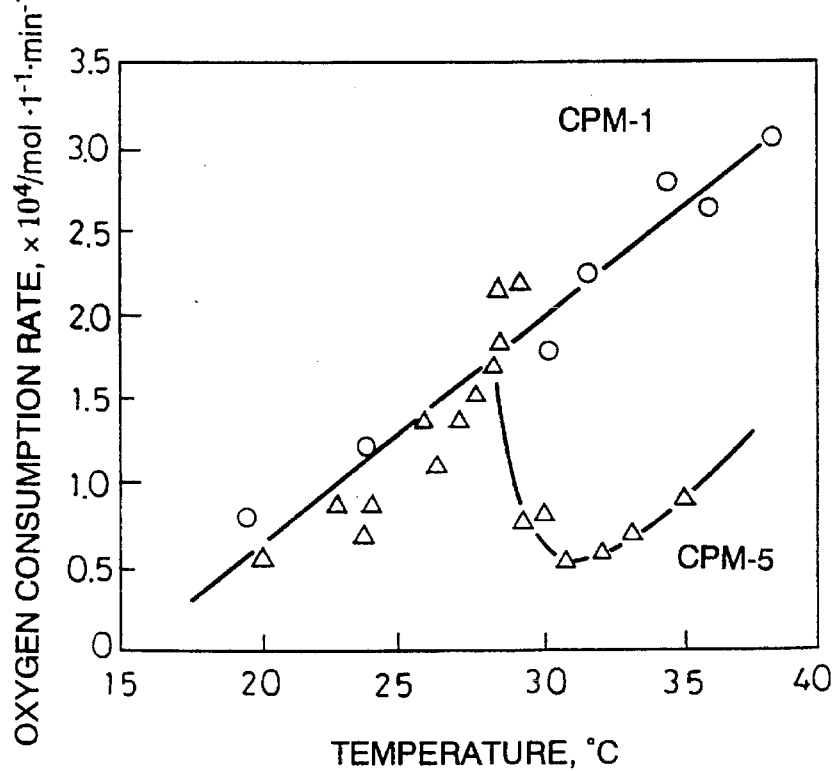
FIG. 2 is a graph showing the temperature dependency of the catalytic activity of a phthalocyanine-containing polymer according to the invention.

Using a 0.2N carbonate buffered solution adjusted to pH 10.21, the dependency of activity on temperature was measured. The results are plotted in FIG. 2. CPM-1 increased its catalytic activity in linear proportion to a temperature rise (circles o in FIG. 2). CPM-5 in aqueous solution underwent phase transition at about 32° C., beyond which the aqueous solution became white turbid and a drop of catalytic activity was observed (triangles Δ in FIG. 2). It is believed that since the catalyst becomes a heterogeneous system above the phase transition temperature, the activity lowers despite a temperature rise. CPM-5 is a temperature responsive polymeric catalyst which enables control of reaction rate and recovery of water-soluble catalyst.

Example 19

Using CPM-1 having cobalt phthalocyanine as an active center (Example 13) and CPM-1' having manganese phthalocyanine as an active center (Example 14), the catalase-like catalyst reaction of decomposing hydrogen peroxide in the presence of 4-dimethylaminopyridine (DMAPy) was examined. In an aqueous solution which had been fully deoxidized with argon were dissolved $8\times10^{-5}$ mol/liter of CPM-1 or CPM-1' and $1.5\times10^{-2}$ mol/liter of DMAPy. To this aqueous solution, $1.76\times10^{-1}$ mol/liter of $H_2O_2$ was added (pH 7.0, 25° C.). The concentration of oxygen given off was measured by means of a trace oxygen concentration meter. The turnover number of the catalyst was determined from the initial rate. The results are plotted in FIG. 3 wherein circles ○ correspond to CPM-1 and squares □ correspond to CPM-1'.

Figure 3:
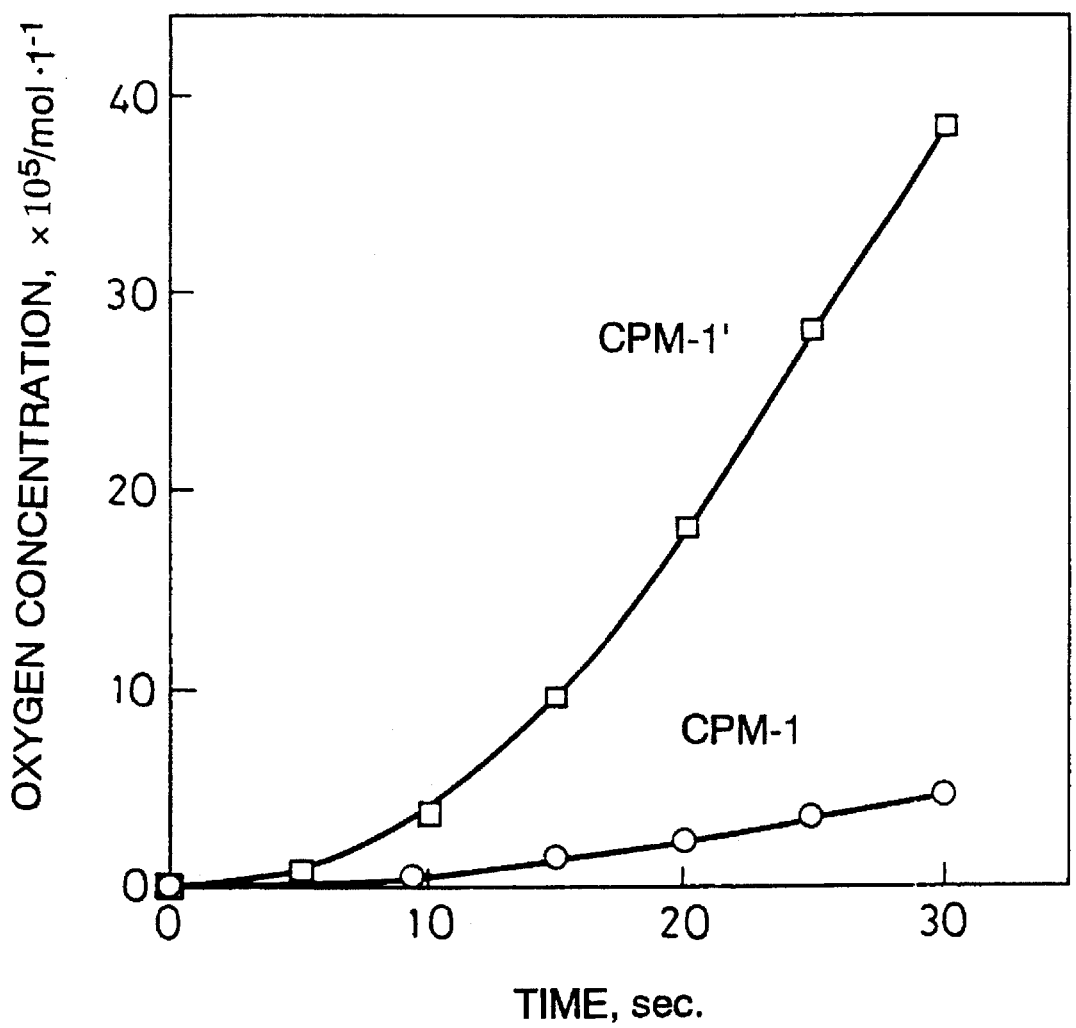
FIG. 3 is a graph showing the catalytic activity of a phthalocyanine-containing polymer according to the invention.

As seen from FIG. 3, Mn complex polymer CPM-1' has a great ability to decompose hydrogen peroxide. It is understood that in the polymeric catalyst of CPM-1' containing manganese phthalocyanine, a reaction intermediate which is a Mn(IV) 5-coordinate complex with DMAPy coordinated in the polymer has improved stability which contributes to an improvement in catalytic activity.

It was also found that an increase in the concentration of an active species $HOO^-$ by the addition of a base was also effective for increasing the catalytic activity of CPM-1'. This was also supported by the fact that catalytic activity was reduced when pyridine and 4-methylpyridine having a lower alkalinity than DMAPy were used.

Example 20

Synthesis of a nitro-substituted phthalocyanine compound of formula (12) wherein $R^{12}=R^{13}=R^{14}=$—$OCH(CH_3)CH_2CH(CH_3)_2$ $(CH_3)_2CHCH_2CH(CH_3)$—OH was reacted with sodium hydride at 0° to 30° C. to form $(CH_3)_2CHCH_2CH(CH_3)$—ONa, which was reacted with nitrophthalonitrile of formula (25) at 0° to 100° C. to form an alkoxyphthalonitrile of formula (26).

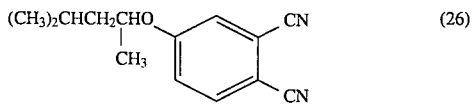

(26)

In 100 ml of n-pentanol were dissolved $1.34\times10^{-3}$ mol of the alkoxyphthalonitrile and $4.30\times10^{-3}$ mol of nitrophthalonitrile. Reaction was carried out in nitrogen in the presence of a DBN catalyst by heating at 100° C. under reflux for 24 hours. A precipitate was removed from the reaction solution and purified, obtaining an end compound designated Compound (a).

By following the above procedure, nitro-substituted phthalocyanine compounds were synthesized wherein the combination of $R^{12}$ to $R^{14}$ is changed from that of M-15 to those of M-7 to M-11 in Table 1.

These compounds were similarly identified as in Example 1 and had a purity and solubility equivalent to those of Example 1.

Example 21

Synthesis of an amino-substituted phthalocyanine compound of formula (13) wherein $R^{12}=R^{13}=R^{14}=$—$OCH(CH_3)CH_2CH(CH_3)_2$ Using Compound (a) synthesized in Example 20 as a starting reactant, an end product designated Compound (b) was prepared as in Example 3.

Using the remaining compounds synthesized in Example 20 as a starting reactant, amino-substituted phthalocyanine compounds were similarly synthesized.

These compounds were similarly identified as in Example 3 with their purity and solubility being equivalent to those of Example 3.

Example 22

Synthesis of a phthalocyanine compound of formula (9) (M-15 in Table 1)

Using $1.43\times10^{-3}$ mol of Compound (b) synthesized in Example 21, an end product was prepared as in Example 5.

Using the remaining compounds synthesized in Example 21 as a starting reactant, phthalocyanine compounds M-7 to M-11 in Table 1 were similarly synthesized.

These compounds were similarly identified as in Example 5 and had a purity and solubility equivalent to those of Example 5.

Example 23

As in Example 2, a metal was introduced into the phthalocyanine compounds synthesized in Examples 20 to 22, obtaining metal phthalocyanine compounds. These compounds were similarly identified. Their purity and solubility were equivalent to those of Examples 2, 4 and 6.

Example 24

To a 0.5M benzene solution of each of the compounds synthesized in Example 22 was added AIBN in a concentration of 2% by weight. As in Example 7, the solution was heated at 60° C. under reflux for 24 hours, obtaining a polymer.

These polymers were identified as in Example 7. They had the same terminal group as in Example 7. Their purity, number average molecular weight and solubility were equivalent to those of Example 7.

Example 25

As in Example 8, a metal was introduced into the polymers synthesized in Example 24, obtaining metal-bearing polymers.

These polymers were identified as in Example 8. They had the same terminal group as in Example 24. Their purity, number average molecular weight and solubility were equivalent to those of Example 8.

Example 26

To a solvent mixture of 50 g of dichloromethane, 50 g of n-hexane and 100 g of water was added 14.5 g of phthalocyanine compound M-15 synthesized in Example 22. After 9.5 g of bromine was added to the solution, reaction was carried out at 40° C. for 3 hours. After cooling to 20° C., 50 g of toluene was added to the reaction solution, which separated into two layers. The organic solvent layer was washed with 100 g of 10% sodium hydrogen sulfite aqueous solution and 100 g of 5% sodium hydrogen carbonate aqueous solution. The organic solvents were distilled off, obtaining compound M-35 which was a brominated product of M-15. It was identified as in Example 22. Its purity and solubility were equivalent to those of Example 22.

Example 27

A nitro-substituted phthalocyanine compound was synthesized as in Example 20 by dissolving $1.34\times10^{-2}$ mol of a monofluorinated ethoxyphthalonitrile of formula (27) and $4.30\times10^{-3}$ mol of nitrophthalonitrile in 100 ml of n-pentanol. Reaction was carried out in nitrogen in the presence of a DBN catalyst by heating under reflux for 24 hours.

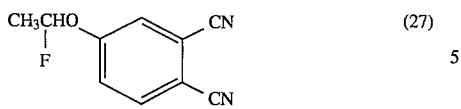
(27)

Using the nitro-substituted phthalocyanine compound as a starting reactant, an amino-substituted phthalocyanine compound was synthesized as in Example 21.

Using the amino-substituted phthalocyanine compound, M-14 was synthesized as in Example 22.

These compounds were similarly identified as in Examples 20 to 22 with their purity and solubility being equivalent to those of Examples 20 to 22.

Example 28

Using the nitro- and amino-substituted phthalocyanine compounds and M-14 synthesized in Example 27, metal-coordinated phthalocyanine compounds were prepared as in Example 23. These compounds were similarly identified and had a purity and solubility equivalent to those of Example 23.

Example 29

As in Example 24, a polymer was prepared from M-14 synthesized in Example 27. It was identified as in Example 24. The polymer had the same terminal group as in Example 24 and its purity, number average molecular weight, and solubility were equivalent to those of Example 24.

Example 30

As in Example 25, a metal-bearing phthalocyanine polymer were prepared from the polymer synthesized in Example 29. The polymer had the same terminal group as in Example 29 and its purity, number average molecular weight, and solubility were equivalent to those of Example 25.

Example 31

Phthalocyanine compound M-18 in Table 2 was synthesized by the same procedures as in Examples 1, 3 and 5 except that the starting reactant in Example 1 was replaced by 3-t-butylphthalonitrile of formula (28).

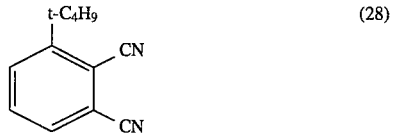
(28)

The remaining phthalocyanine compounds in Table 2, M-19 to M-32 and M-36 were similarly synthesized and identified.

From the phthalocyanine compounds including the nitro- and amino-substituted phthalocyanine compounds available at intermediate stages of the synthesis process thereof, metal-bearing compounds were prepared as in Examples 2, 4 and 6. They were similarly identified. Their purity and solubility were equivalent to those of Examples 2, 4 and 6.

Example 32

As in Example 7, polymers were prepared from the phthalocyanine compounds M-18 to M-32 in Table 2 and M-36 synthesized in Example 31. They were similarly identified.

As in Example 8, a metal was introduced into each of these polymers. The metal-bearing polymers were similarly identified.

These polymers had the same terminal group as in Examples 7 and 8 and their purity, number average molecular weight, and solubility were equivalent to those of Examples 7 and 8.

Example 33

As in Examples 9 to 12, copolymers CP-4, CP-7 and CP-8 in Table 3, CP-11 to CP-18 in Table 4, CP-21 and CP-22 were synthesized.

As in Examples 13 to 15, a metal was introduced into each of these copolymers.

These copolymers were identified as in Examples 9 to 15 and their purity and solubility were equivalent to those of Examples 9 to 15.

Example 34

An optical recording disk (CD-R) was manufactured by dissolving phthalocyanine compound M-35 synthesized in Example 26 in n-hexane in a concentration of 6% by weight, applying the solution to a polycarbonate substrate of 120 mm diameter and 1.2 mm thick by spin coating to form a recording layer, forming a reflecting film on the recording layer and overlying a protective film thereon.

The recording layer was 150 nm thick (dry film thickness). The reflecting film was formed by sputtering Au to a thickness of 85 nm. The protective film was formed by applying and curing a UV-curable acrylic resin to a thickness of 5 μm.

Signals could be recorded in the disk with a laser power of 7 mW (recording wavelength 680 nm).

Another optical recording disk was manufactured by the same procedure as above except that M-15 was used instead of M-35. This disk was also practically acceptable. The former disk showed a 5% improvement in reflectivity (Itop) over the latter disk when signals were read out with a laser (680 nm) and was thus regarded effective for providing higher sensitivity.

Example 35

An optical recording disk (CD-R) was manufactured by the same procedure as in Example 34 except that the recording layer was formed using a 6 wt. % fluorinated alcohol solution of M-14 synthesized in Example 27. No indications of dissolution and swelling of the polycarbonate substrate were noticed. The disk performed well.

Example 36

Synthesis of a nitro-substituted phthalocyanine compound of formula (16) wherein $R^{12}=R^{13}=R^{14}=R^{32}=R^{33}=R^{34}=$t-butylthio group To a solution of 1 mol of 1,2-dibutylthiobenzene in 50 ml of acetic acid was added dropwise 2 mol of bromine in an ice bath. After 2 hour reaction, water was added to the reaction solution. Upon removal of the insoluble by filtration, 1,2-dibromo-4,5-dibutylthiobenzene of formula (29) was obtained.

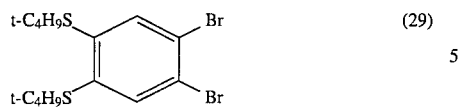

Thereafter, the product was reacted with 2 mol of copper cyanide in DMF for 6 hours, obtaining 1,2-dibutylthiophthalonitrile of formula (30).

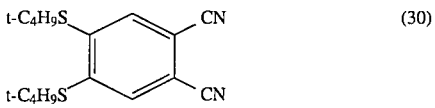

The end product was purified by column chromatography and further by recrystallization. It was identified by IR, NMR, and elemental analysis.

In 1000 ml of ethanol were dissolved 0.54 mol of 1,2-dibutylthiophthalonitrile and 0.27 mol of nitrophthalonitrile of formula (25). Reaction was carried out in nitrogen in the presence of 10.1 g DBN catalyst by heating at 100° C. under reflux for 24 hours. The resulting precipitate was dissolved in chloroform (CHCl$_3$) and purified with silica gel, obtaining an end product.

It was identified as in Example 1 and had a purity and solubility equivalent to those of Example 1.

Example 37

Synthesis of an amino-substituted phthalocyanine compound of formula (17) wherein $R^{12}=R^{13}=R^{14}=R^{32}=R^{33}=R^{34}$=t-butylthio group Using the nitro-substituted phthalocyanine compound synthesized in Example 36 as a starting reactant, an end product was prepared as in Example 3. It was identified as in Example 3 and had a purity and solubility equivalent to those of Example 3.

Example 38

Synthesis of phthalocyanine compound M-37

Using the compound synthesized in Example 37, an end product was prepared as in Example 5. It was identified as in Example 5 and had a purity and solubility equivalent to those of Example 5.

Example 39

As in Example 2, a metal was introduced into the phthalocyanine compounds synthesized in Examples 36 to 38, obtaining metal phthalocyanine compounds. These compounds were similarly identified. Their purity and solubility were equivalent to those of Examples 2, 4 and 6.

Example 40

Using compound M-37 obtained in Example 38, a polymer was prepared as in Example 7. It was identified as in Example 7. It had the same terminal group as in Example 7. Its purity, number average molecular weight and solubility were equivalent to those of Example 7.

Example 41

As in Example 8, a metal was introduced into the polymer synthesized in Example 40, obtaining a metal-bearing polymer. It was identified as in Example 8. It had the same terminal group as in Example 40. Its purity, number average molecular weight and solubility were equivalent to those of Example 8.

Example 42

Synthesis of a nitro-substituted phthalocyanine compound of formula (12) wherein $R^{12}=R^{13}=R^{14}$=p-tolylthio group In 1000 ml of ethanol were dissolved 0.54 mol of 4-bromophthalonitrile of formula (31) and 0.27 mol of nitrophthalonitrile of formula (25).

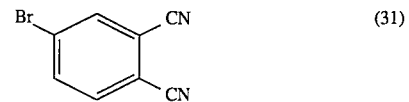

Reaction was carried out in nitrogen in the presence of 10.1 g DBN catalyst by heating at 100° C. under reflux for 24 hours. The resulting precipitate was dissolved in chloroform and purified with silica gel, obtaining 2-nitro-9,16,23-tribromophthalocyanine corresponding to formula (12) wherein $R^{12}=R^{13}=R^{14}$=Br.

This nitro-substituted phthalocyanine, 0.1 mol, was reacted with 0.8 mol of 4-methylphenylthiol and 2 mol of KOH in quinoline at 180° C. for 2 hours. Thereafter, the quinoline and excess thiol were distilled off in vacuum, obtaining a solid. It was purified by column chromatography using toluene as a developer, obtaining an end product.

It was identified as in Example 1 and had a purity and solubility equivalent to those of Example 1.

Example 43

Synthesis of an amino-substituted phthalocyanine compound of formula (13) wherein $R^{12}=R^{13}=R^{14}$=p-tolylthio group Using the nitro-substituted phthalocyanine compound synthesized in Example 42 as a starting reactant, an end product was prepared as in Example 3. It was identified as in Example 3 with their purity and solubility being equivalent to those of Example 3.

Example 44

Synthesis of phthalocyanine compound M-16 in Table 1

Using the compound synthesized in Example 43, an end product was prepared as in Example 5. It was identified as in Example 5 with their purity and solubility being equivalent to those of Example 5.

Example 45

As in Example 2, a metal was introduced into the phthalocyanine compounds synthesized in Examples 42 to 44, obtaining metal phthalocyanine compounds. These compounds were similarly identified. Their purity and solubility were equivalent to those of Examples 2, 4 and 6.

Example 46

Using compound M-16 obtained in Example 44, a polymer was prepared as in Example 7. It was identified as in Example 7. It had the same terminal group as in Example 7. Its purity, number average molecular weight and solubility were equivalent to those of Example 7.

Example 47

As in Example 8, a metal was introduced into the polymer synthesized in Example 46, obtaining a metal-bearing polymer. It was identified as in Example 8. It had the same terminal group as in Example 46. Its purity, number average molecular weight and solubility were equivalent to those of Example 8.

Example 48

Phthalocyanine compound M-17 in Table 1 was synthesized by the same procedures as in Examples 42–44 except that in Example 42, a nitro-substituted phthalocyanine compound was synthesized using t-butylthiol instead of the starting 4-methylphenylthiol. It was similarly identified.

From phthalocyanine compound M-17 and the nitro- and amino-substituted phthalocyanine compounds available at intermediate stages of the synthesis process thereof, metal-coordinated compounds were prepared as in Examples 2, 4 and 6. They were similarly identified. Their purity and solubility were equivalent to those of Examples 2, 4 and 6.

Example 49

As in Example 7, a polymer was prepared from phthalocyanine compound M-17 synthesized in Example 48. It was similarly identified.

As in Example 8, a metal was introduced into the polymer. The metal-bearing polymer was similarly identified.

These polymers had the same terminal group as in Examples 7 and 8 and their purity, number average molecular weight, and solubility were equivalent to those of Examples 7 and 8.

Example 50

Phthalocyanine compounds M-33 and M-34 in Table 2 were synthesized by the same procedures as in Examples 42 to 44 except that in Example 42, a nitro-substituted phthalocyanine compound was synthesized using 3-bromophthalonitrile of formula (32) instead of the 4-bromophthalonitrile. They were similarly identified, with their purity and solubility being equivalent to those of Examples 42 to 44.

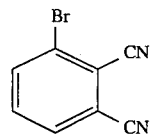

(32)

As in Example 45, metal-bearing phthalocyanine compounds were prepared. They were similarly identified, with their purity and solubility being equivalent to those of Example 45.

As in Example 46, polymers and metal-bearing polymers were prepared. They were similarly identified. They had the same terminal group as in Example 46, with their purity, number average molecular weight and solubility being equivalent to those of Example 46.

Example 51

As in Examples 9 to 12, copolymers CP-9 and CP-10 in Table 3, CP-19 and CP-20 in Table 4, and CP-23 were synthesized.

As in Examples 13 to 15, a metal was introduced into each of these copolymers.

These copolymers were identified as in Examples 9 to 15, with their purity and solubility being equivalent to those of Examples 9 to 15.

There has been described a novel phthalocyanine compound having improved solubility and high purity and containing a polymerizable vinyl group within its molecule. Intermediates to this phthalocyanine compound also have improved solubility and high purity. All they are expected to find use as photo-functional materials complying with a reduction in wavelength of semiconductor lasers. They are well suited as recording material for optical recording media such as write-once compact disks. Further, a novel polymer is obtained by using the novel phthalocyanine compound as a starting monomer. The polymer can be a metal phthalocyanine-containing polymer which has a high content of metal phthalocyanine and is easy to control the orientation of phthalocyanine rings. The control of orientation of phthalocyanine rings is further facilitated by forming a thin film. The polymers are well soluble and some are water soluble. Their purity is high. Some of water-soluble polymers have catalytic activity. The inventive polymers are further expected to find use as various functional materials for light absorption, electric conduction, photo-conduction, energy conversion, electrode and the like.

Japanese Patent Application No. 252493/1993 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A phthalocyanine compound of the following formula:

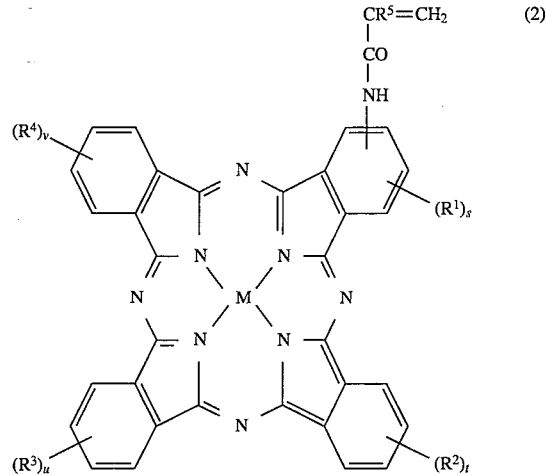

(2)

wherein $R^1$, $R^2$, $R^3$, and $R^4$ are independently selected from the group consisting of an alkyl, alkoxy, alkylthio, and arylthio group, letter s is equal to 0 or an integer of 1 to 3, and the $R^1$ groups may be identical or different when s is at least 2, letters t, u and v each are equal to 0 or an integer of 1 to 4, and the $R^2$, $R^3$, and $R^4$ groups may be identical or different when t, u and v are at least 2, respectively, with the proviso that all of s, t, u, and v are not equal to 0 at the same time, the sum of s+t+u+v being an integer of at least 1, $R^5$ is a hydrogen atom or alkyl group, and M is a metal atom.

2. The phthalocyanine compound of claim 1 wherein the vinyl-containing amide group ($—NHCOCR^5=CH_2$) is at the 5-position of the isoindole ring, s=0, t=u=v=1, and $R^2$, $R^3$, and $R^4$ are at the 5-position of the respective isoindole rings.

3. The phthalocyanine compound of claim 1 wherein the vinyl-containing amide group (—NHCOCR$^5$=CH$_2$) is at the 5-position of the isoindole ring, s=0, t=u=v=1, and $R^2$, $R^3$, and $R^4$ are at the 4-position of the respective isoindole rings.

4. The phthalocyanine compound of claim 1 wherein the vinyl-containing amide group (—NHCOCR$^5$=CH$_2$) is at the 5-position of the isoindole ring, s=0, t=u=v=2, and $R^2$, $R^3$, and $R^4$ are at the 5- and 6-positions of the respective isoindole rings.

5. A method for preparing the phthalocyanine compound of claim 2 comprising preparing a phthalocyanine compound of the following formula (1):

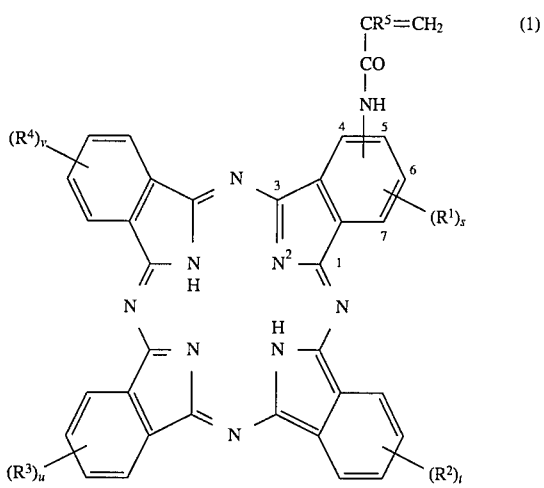

wherein $R^1$, $R^2$, $R^3$, and $R^4$ are independently selected from the group consisting of an alkyl, alkoxy, alkylthio, and arylthio group; s is equal to 0 or an integer of 1 to 3, and the R1 groups may be identical or different when s is at least 2; t, u and v each are equal to 0 or an integer of 1 to 4, and the $R^2$, $R^3$, and $R^4$ groups may be identical or different when t, u and v are at least 2, respectively; with the proviso that all of s, t, u, and v are not equal to 0 at the same time, the sum of s+t+u+v being an integer of at least 1; and $R^5$ is a hydrogen atom or alkyl group, by a method comprising the steps of:

forming a nitro-substituted phthalocyanine compound of the following formula (3) by reacting phthalonitriles including an alkyl-, alkoxy-, alkylthio- or arylthio-substituted phthalonitrile and a nitrophthalonitrile or by effecting substitution reaction of a halogenated nitro-substituted phthalocyanine compound, reducing the nitro group of said nitro-substituted phthalocyanine compound to form an amino-substituted phthalocyanine compound of the following formula (4), and introducing an acryloyl group into the amino group of said amino-substituted phthalocyanine compound of formula (4) to form the phthalocyanine compound of formula (1)

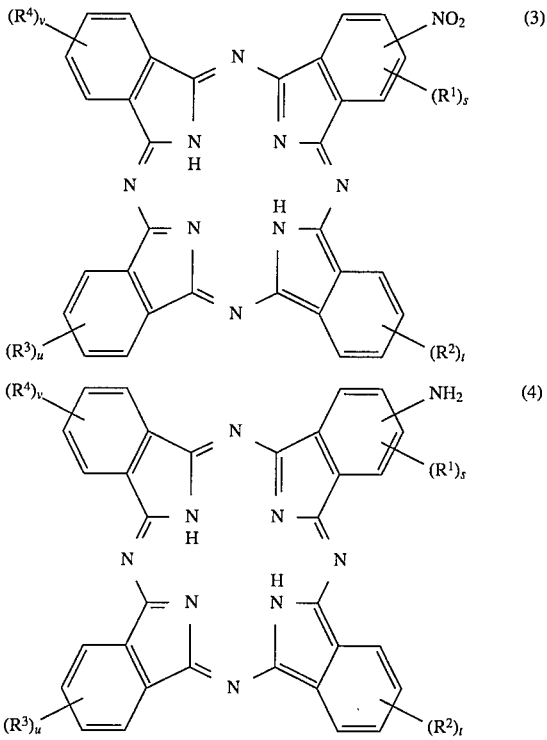

wherein $R^1$ to $R^5$, t, u, and v are as defined above, and introducing a metal into the phthalocyanine compound of formula (1).

6. The nitro-substituted metal phthalocyanine compound obtained in claim 5.

7. The amino-substituted metal phthalocyanine compound obtained in claim 5.

* * * * *

UNITED STATES PATENT AND TRADEMARK OFFICE
CERTIFICATE OF CORRECTION

PATENT NO. : 5,618,930
DATED : April 8, 1997
INVENTOR(S) : Mutsumi KIMURA, et al.

It is certified that error appears in the above-identified patent and that said Letters Patent is hereby corrected as shown below:

In the title page, item [75] "Inventors: Mutsumi Kimura, Ueda; Hirofusa Shirai, 2496, Nagase, Maruko-cho, Chiisagata-gun, Nagano; Toshiki Koyama; Kenji Hanabusa, both of Ueda; Yuichi Kubota, Chiba, all of Japan" should read --"Inventors: Mutsumi KIMURA, Hirofusa SHIRAI, Toshiki KOYAMA and Kenji HANABUSA, all of Nagano; Yuichi KUBOTA, Chiba, all of Japan--.

Column 51, line 38, "R1" should read --$R^1$--.

Column 52, line 41, after "$R^5$, insert --s,--.

Signed and Sealed this

Twenty-first Day of October 1997

Attest:

BRUCE LEHMAN

*Attesting Officer*      Commissioner of Patents and Trademarks